(12) United States Patent
Osada

(10) Patent No.: US 10,805,493 B2
(45) Date of Patent: Oct. 13, 2020

(54) IMAGE FORMING APPARATUS, METHOD OF CONTROLLING THE SAME, AND STORAGE MEDIUM

(71) Applicant: CANON KABUSHIKI KAISHA, Tokyo (JP)

(72) Inventor: Tomoaki Osada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/656,727

(22) Filed: Jul. 21, 2017

(65) Prior Publication Data

US 2018/0034991 A1 Feb. 1, 2018

(30) Foreign Application Priority Data

Jul. 26, 2016 (JP) .................. 2016-146050

(51) Int. Cl.
*H04N 1/00* (2006.01)
*H04N 1/393* (2006.01)

(52) U.S. Cl.
CPC ..... *H04N 1/00822* (2013.01); *H04N 1/00652* (2013.01); *H04N 1/3935* (2013.01); *H04N 2201/0094* (2013.01)

(58) Field of Classification Search
CPC combination set(s) only.
See application file for complete search history.

(56) References Cited

U.S. PATENT DOCUMENTS

| 4,564,288 | A | * | 1/1986 | Nonoue | G03B 27/542 |
| | | | | | 355/57 |
| 6,145,834 | A | | 11/2000 | Hirota | |
| 2012/0081759 | A1 | * | 4/2012 | Itoh | H04N 1/00588 |
| | | | | | 358/449 |
| 2013/0044339 | A1 | | 2/2013 | Takahashi | |
| 2016/0065766 | A1 | * | 3/2016 | Miyamoto | H04N 1/00506 |
| | | | | | 358/1.13 |
| 2017/0050812 | A1 | * | 2/2017 | Mukai | B65H 3/46 |
| 2017/0183191 | A1 | * | 6/2017 | Taki | B65H 31/34 |

FOREIGN PATENT DOCUMENTS

| CN | 1187082 A | 7/1998 |
| CN | 1202778 A | 12/1998 |
| JP | 2010-141508 A | 6/2010 |
| JP | 2010-278870 A | 12/2010 |
| JP | 2016-58768 A | 4/2016 |

* cited by examiner

*Primary Examiner* — Helen Zong
(74) *Attorney, Agent, or Firm* — Canon U.S.A., Inc. IP Division

(57) ABSTRACT

A method of controlling an image forming apparatus having an image reading unit capable of conveying and reading a plurality of documents of different sizes includes determining whether an automatic magnification function is set in a case where an instruction to read a plurality of documents of different sizes is given, and performing control such that, in a case where the determining determines that the automatic magnification function is not set, a first document reading mode in which the plurality of documents is conveyed at a constant conveyance speed and is read is set to the image reading unit, and, in a case where the determining determines that the automatic magnification function is set, a second document reading mode in which the plurality of documents is conveyed at a different conveyance speed for each document and is read is set to the image reading unit.

8 Claims, 20 Drawing Sheets

IMAGE FORMING APPARATUS, METHOD OF CONTROLLING THE SAME, AND STORAGE MEDIUM

BACKGROUND

Field of the Disclosure

The present disclosure relates to an image forming apparatus and a method of controlling the image forming apparatus.

Description of the Related Art

Image forming apparatuses such as copying machines and facsimile apparatuses include image reading apparatuses. Further, some of various image reading apparatuses include automatic document conveyance apparatuses (auto document feeder (ADF)).

Many image forming apparatuses include a function that requires document size detection before a start of document image reading. Examples of a function that requires document size detection before image reading include an automatic sheet selection function and an automatic zoom selection function. The automatic sheet selection function is to automatically select a sheet of an appropriate size for the size of a document, a selected zoom, and a setting with or without image rotation. Further, the automatic zoom selection function is to calculate an image zoom for enlarging or reducing a read document image for a selected sheet size, and then to automatically set the zoom. Functions such as the automatic sheet selection function and the automatic zoom selection function are executed by a main control unit included in an image forming apparatus.

A same-width/different-size mixed documents reading mode and a different-width/different-size mixed documents reading mode, which are modes of reading a set of documents of different sizes, have also become important among modes of document image reading using an automatic document conveyance apparatus. High productivity is also demanded by users in the document image reading set to the same/different width different size mixed documents reading modes. In a case where the automatic zoom selection function and the different size mixed documents reading mode are used in combination, a suitable reading speed for an automatic zoom is set to each document, and each document is read at the set reading speed.

Further, in manual fax transmission (direct transmission), a transmission resolution can be changed suitably for each document, and the reading speed is changed according to a selected resolution. Reading in manual fax transmission is generally performed in a long document reading (free size) mode.

In the reading in which the reading speed may be changed for each document as described above, different conveyance speeds may be set to a previous document and a next document, so that the reading unit cannot read the next document until the previous document passes completely through a reading unit. Specifically, conveyance of the next document cannot start and needs to wait. This increases document intervals to result in poor performance.

Japanese Patent Application Laid-Open No. 2016-58768 discusses a method in which when an automatic zoom selection function and a different size mixed documents reading mode are used in combination, a reading unit estimates a maximum document size and transfers to a main control unit an image reduced in advance based on the estimated size.

The method discussed in Japanese Patent Application Laid-Open No. 2016-58768 can perform reading at a constant speed with reduced sheet intervals to improve performance, but the main control unit needs to perform enlarging processing as needed based on the size of a recording sheet. Enlarging a reduced image by image processing can degrade the image.

SUMMARY

According to an aspect of the present disclosure, an image forming apparatus having an image reading unit capable of conveying and reading a plurality of documents of different sizes includes a determination unit configured to determine whether an automatic magnification function is set in a case where an instruction to read a plurality of documents of different sizes is given, and a control unit configured to perform control such that, in a case where the determination unit determines that the automatic magnification function is not set, a first document reading mode in which the plurality of documents is conveyed at a constant conveyance speed and is read is set to the image reading unit, and, in a case where the determination unit determines that the automatic magnification function is set, a second document reading mode in which the plurality of documents is conveyed at a different conveyance speed for each document and is read is set to the image reading unit.

Further features of the present disclosure will become apparent from the following description of exemplary embodiments with reference to the attached drawings.

DESCRIPTION OF THE EMBODIMENTS

Various exemplary embodiments of the disclosure will be described below with reference to the drawings. While a multi-function peripheral (MFP) will be described as an example of an image forming apparatus according to the present exemplary embodiment of the present disclosure, the image forming apparatus is not limited to the MFP and can be any image forming apparatus that includes a reading function. For example, the image forming apparatus can be a facsimile apparatus.

<Overview of Image Forming Apparatus>

Figure 1:
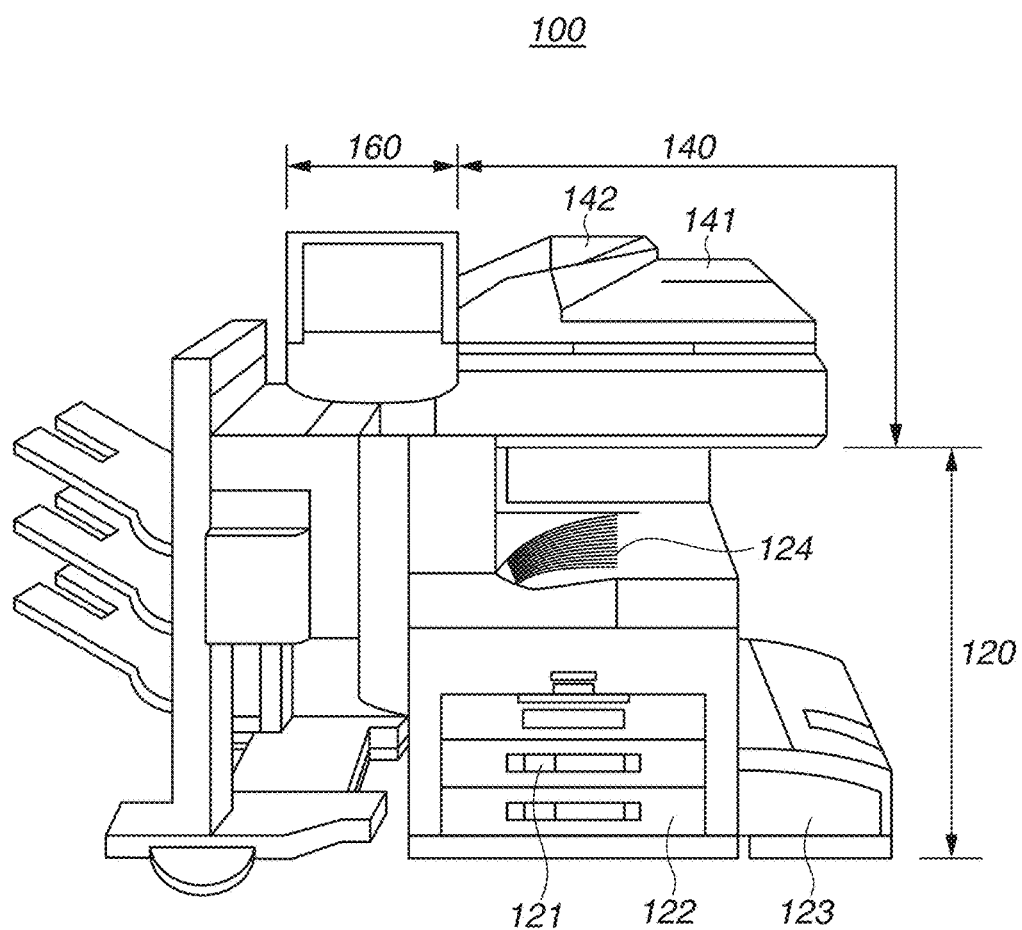
FIG. 1 schematically illustrates an image forming apparatus according to one or more aspects of the present disclosure.

FIG. 1 schematically illustrates an image forming apparatus.

A reading unit 140 serving as an image reading unit inputs to a linear image sensor (charge-coupled device (CCD) sensor) reflection light obtained by exposing and scanning an image on a document with light emitted from an illumination lamp to convert information about the image into electric signals. The reading unit 140 further converts the electric signals into luminance signals of red (R), green (G), and blue (B) colors and outputs the luminance signals as image data to a main control unit 400 (in FIG. 3) described below.

A document is set on a document setting tray 142 of a document feeder 141. In response to a user instruction to start reading from an operation unit 160, the main control unit 400 transmits a document reading instruction to the reading unit 140. Upon receiving the document reading instruction, the reading unit 140 performs an operation to feed documents one by one from the document setting tray 142 of the document feeder 141 and to read the fed documents (hereinafter, this operation mode is referred to as a "document feeding-reading mode"). Further, a document can be placed on a document platen glass 1401 described below to be read.

A printer 120 is an image forming device configured to form image data received from the main control unit 400 on a sheet.

An image forming method according to the present exemplary embodiment is an electrophotographic method using a photosensitive drum and a photosensitive belt. The printer 120 includes a plurality of sheet cassettes 121, 122, and 123 capable of holding sheets of different sizes or orientations, and printed sheets are discharged to a sheet discharge tray 124.

<Image Forming Apparatus—Reading Unit>

Figure 2:
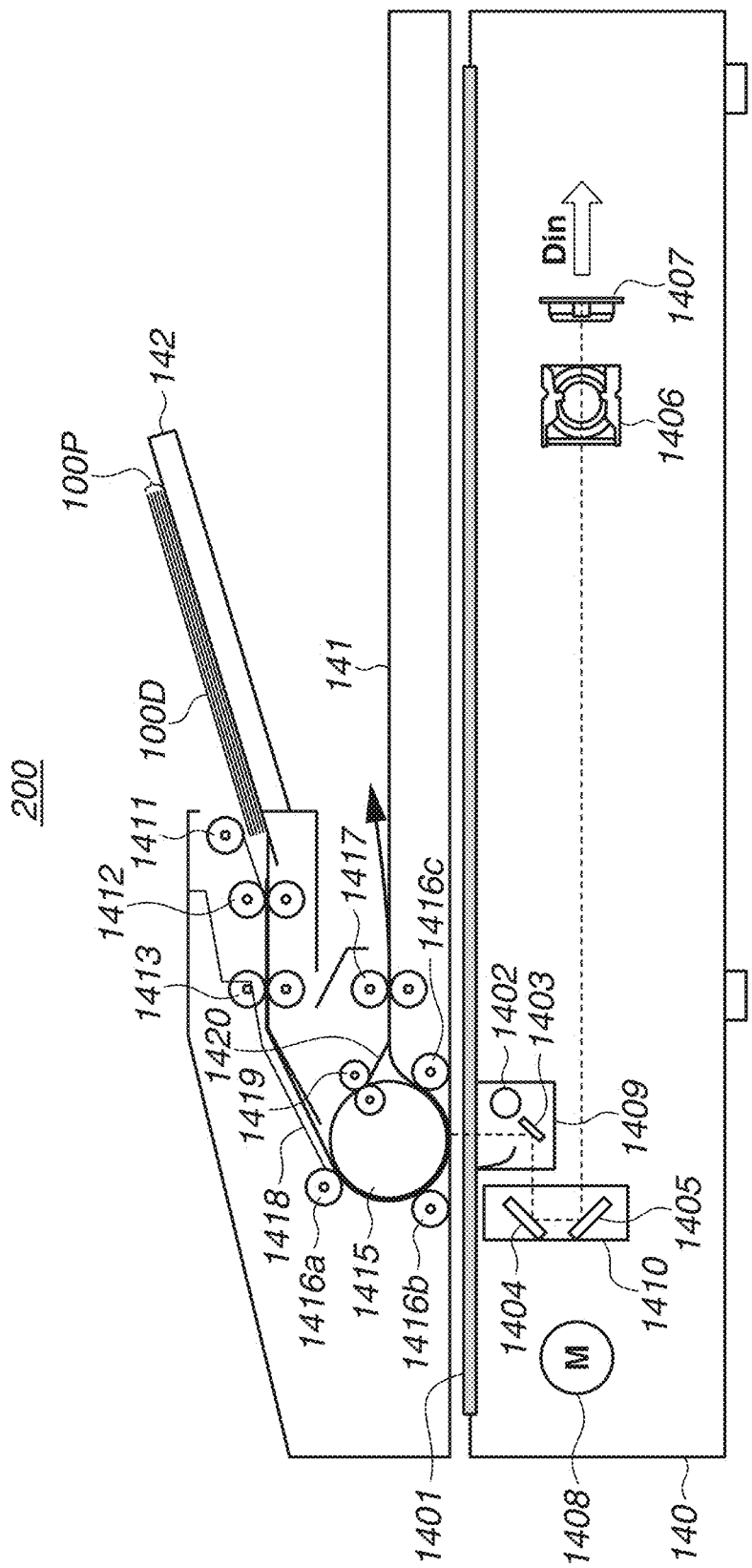
FIG. 2 illustrates a structure of a reading unit.

FIG. 2 schematically illustrates main components and reading operations of the reading unit 140 using the linear image sensor according to the present exemplary embodiment. Especially, FIG. 2 schematically illustrates main components and reading operations in the "document feeding-reading mode" in which the document feeder 141 is operated to read documents.

In FIG. 2, documents 100P to be read are placed on the document setting tray 142. An advancing roller 1411, a separation/conveyance roller 1412, and a registration roller 1413 are provided in a downstream portion in a document conveyance direction. The advancing roller 1411 is rotated by a driving source (not illustrated) to move forward the documents 100P placed on the document setting tray 142.

Then, the separation/conveyance roller 1412 located downstream of the advancing roller 1411 separates and conveys an uppermost document 100D from the conveyed documents 100P. A start of rotation of the registration roller 1413 located downstream of the separation/conveyance roller 1412 is a reference timing of conveying the document 100D and a reference timing of reading an image thereafter. The driving source which drives the advancing roller 1411, the separation/conveyance roller 1412, and the registration roller 1413 is, for example, a stepping motor.

The document 100D discharged from the registration roller 1413 is moved forward along a guide plate 1418, sandwiched by a rotative large-diameter conveyance drum 1415 and driven rollers 1416a, 1416b, and 1416c, and conveyed along an outer surface of the conveyance drum 1415. At this time, the document 100D is first passed through a surface the document platen glass 1401 and then conveyed at a constant speed in a direction of an arrow illustrated in FIG. 2.

The image reading unit, which will be described below, performs image reading on the document 100D when the document 100D is passed through the surface of the document platen glass 1401.

After the image reading, the document 100D continues to be conveyed along the outer surface of the conveyance drum 1415 and is then discharged onto the document feeder 141 by a sheet discharge roller 1417.

In a case of reading both sides of the document 100D, after the sheet discharge roller 1417 conveys a rear end of the document 100D, a driving direction is reversed, and the document 100D is conveyed along a reverse sheet feeding flapper 1420 toward a reverse roller 1419. Then, the document 100D is sandwiched by the driven rollers 1416a, 1416b, and 1416c and conveyed along the outer surface of the conveyance drum 1415. When the document 100D is passed through the surface of the document platen glass 1401, image reading is performed on a back surface of the document 100D. In the document feeding-reading mode, it is only needed to move documents in a constant direction, so continuous high-speed reading of a large number of documents is possible.

The following describes the image reading unit according to the present exemplary embodiment. In the document feeding-reading mode, as described above, the document 100D is passed through the surface of the document platen glass 1401. At this time, a first mirror unit 1409 and a second mirror unit 1410 are moved by a motor 1408, and fixed in positions specified in FIG. 2. Thus, when facing the surface of the document platen glass 1401, the document 100D is illuminated by an illumination lamp 1402 included in the first mirror unit 1409, and reflection light from the document 100D travels through mirrors 1403, 1404, and 1405 and is then focused onto a CCD sensor 1407 by a lens 1406. The reflection light input to the CCD sensor 1407 is converted into electric signals by the CCD sensor 1407. The electric signals of pixels are converted into digital data by an analog/digital (A/D) conversion device (not illustrated), and the digital data is input as a pixel signal Din to the main control unit 400.

In this method, a bar-shaped light source is used, and a reading line is set parallel to a longer-side direction of the light source. The document 100D is conveyed in a direction perpendicular to the reading line. A direction parallel to the reading line is defined as a main scan direction, and the direction perpendicular to the reading line (a document conveyance direction) is defined as a sub-scan direction.

Besides the document feeding-reading mode, there is a method in which a document to be read is placed on the document platen glass 1401, and image reading is performed on the placed document. In this method, the first mirror unit 1409 including the mirror 1403 and the illumination lamp 1402 is moved at a speed V under the document platen glass 1401 on which the document 100D is placed. Further, the second mirror unit 1410 including the mirrors 1404 and 1405 is moved at a speed V/2 in the same direction as the direction in which the first mirror unit 1409 is moved, whereby a front surface of the document is scanned. The first mirror unit 1409 and the second mirror unit 1410 are driven by the motor 1408.

<Main Control Unit—Block Diagram>

Figure 3:
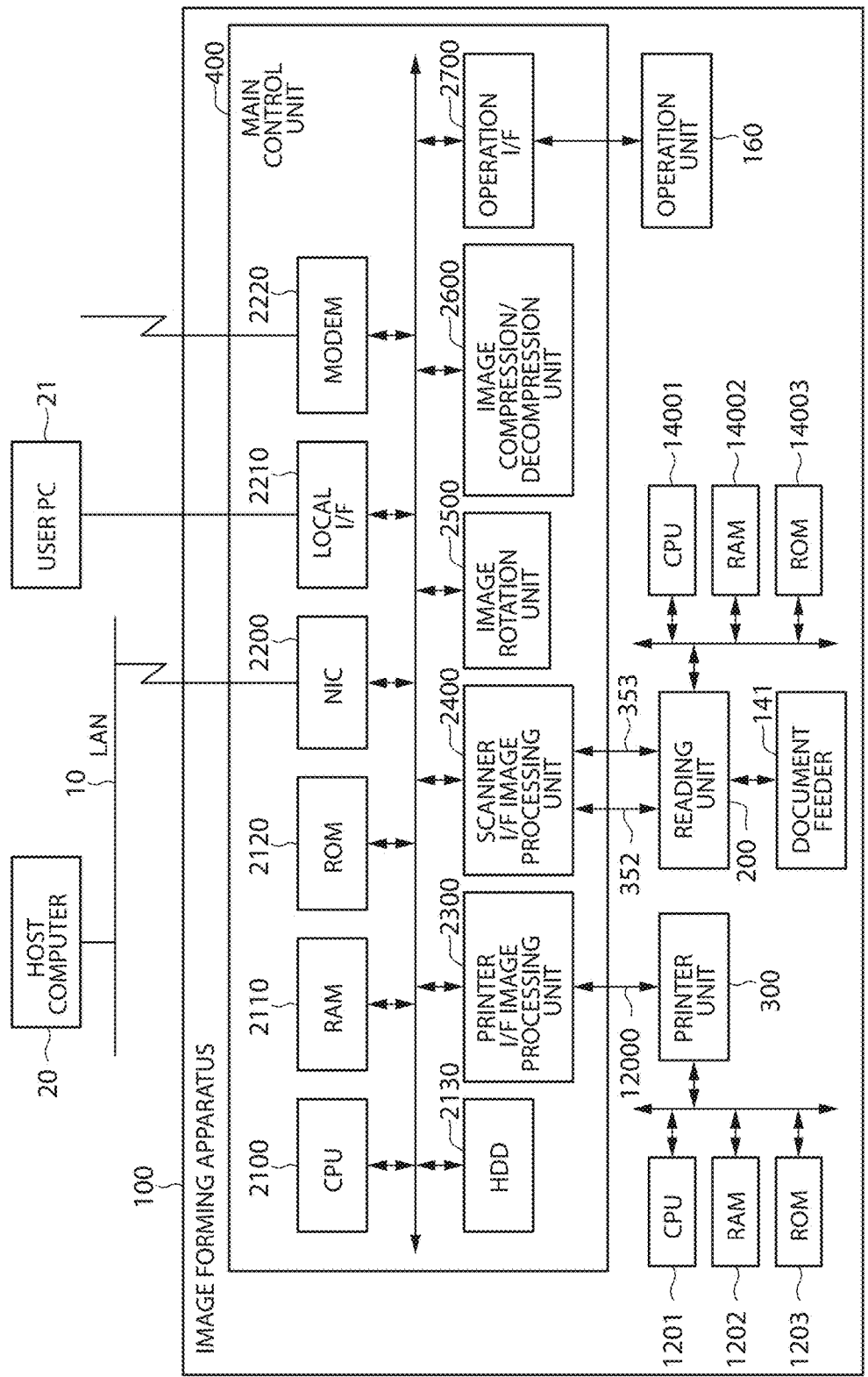
FIG. 3 is a block diagram illustrating a configuration of the image forming apparatus according to one or more aspects of the present disclosure.

FIG. 3 is a block configuration diagram illustrating an image forming apparatus 100 including the main control unit 400 as an electronic component according to an exemplary embodiment of the present disclosure.

The image forming apparatus 100 is connected to a host computer 20 via a local area network (LAN) 10 such as Ethernet®. The image forming apparatus 100 having a central processing unit (CPU) 1201, a random access memory (RAM) 1202 and a read-only memory (ROM) 1203.

The image forming apparatus 100 includes a reading unit 200 and a printer unit 300. The reading unit 200 is a reading device configured to perform image data reading processing. The printer unit 300 is a printer device configured to perform image data output processing. The image forming apparatus 100 further includes the operation unit 160 including a keyboard for performing image data input/output operations and a liquid crystal panel for displaying image data and for setting various functions. The image forming apparatus 100 further includes a hard disk drive (HDD) 2130 capable of storing/saving image data read by controlling the reading unit 200 and image data generated from code data received from the host computer 20 via the LAN 10. The foregoing components are controlled by the main control unit 400 connected to each other to constitute the image forming apparatus 100.

The reading unit 200 includes a document feeding unit and a reading section. The document feeding unit conveys a document sheet. The reading section optically reads a document image and converts the read document image into image data as an electric signal. The printer unit 300 includes a sheet feeding unit, a marking unit, and a sheet discharge unit. The sheet feeding unit includes a manual sheet feeding tray and a sheet feeding cassette for storing printing sheets. The marking unit transfers and fixes image data onto a printing sheet. The sheet discharge unit performs sorting processing and stapling processing on printed sheets.

The main control unit 400 includes a plurality of functional blocks. For example, the main control unit 400 provides a copy function of controlling the reading unit 200 to read document image data and of controlling the printer unit 300 to output the image data onto a printing sheet. The main control unit 400 provides a reading function of converting image data read from the reading unit 200 into code data and of transmitting the code data to the host computer 20 via the LAN 10. The main control unit 400 provides a printer function of converting code data received from the host computer 20 via the LAN 10 into image data and of outputting the image data to the printer unit 300. The main control unit 400 provides a box function of saving image data read from the reading unit 200 in the HDD 2130 and of outputting the saved image data to the printer unit 300. Further, the main control unit 400 provides a fax function of converting image data read from the reading unit 200 into code data, of transmitting the code data to a fax apparatus via a telephone line, of converting the code data received via the telephone line into image data, and of outputting the image data to the printer unit 300.

The main control unit 400 includes the HDD 2130 capable of storing therein a plurality of pieces of job data, a CPU 2100, a RAM 2110, which is a main memory, and a ROM 2120.

The CPU 2100 sequentially reads programs stored in the ROM 2120 or the HDD 2130 into the RAM 2110 and executes the read programs to realize the functions. Further, the CPU 2100 is connected to the reading unit 200, which performs the image data reading processing, and the printer unit 300, which performs image data outputting processing, while being connected to the LAN 10 and the telephone line to input and output code data, image data, device information, etc.

The RAM 2110 is a system work memory used by the CPU 2100 to operate. The RAM 2110 is also an image memory for temporarily storing image data. The ROM 2120 functions as a boot ROM, and a system boot program is stored in the ROM 2120. In the HDD 2130, system software, image data, etc. can be stored.

The foregoing devices are located on a system bus. The plurality of function blocks includes a network interface card (NIC) 2200, a local I/F 2210, a modem 2220, a scanner I/F image processing unit 2400, an image rotation 2500, an image compression/decompression unit 2600 and an operation I/F 2700. The local I/F 2210 is connected to a user personal computer (PC) 21. Main control unit-reading unit interfaces (I/Fs) 352 and 353 are connected to the reading unit 200, which is an image input device. A main control unit-printer unit I/F 12000 is connected to the printer unit 300, which is an image output device. The main control unit 400 performs synchronous/asynchronous conversion and control on image data via the interfaces. The NIC 2200 is connected to the LAN 10 to input and output image data and apparatus information.

<Reading Unit—Block Diagram>

Figure 4:
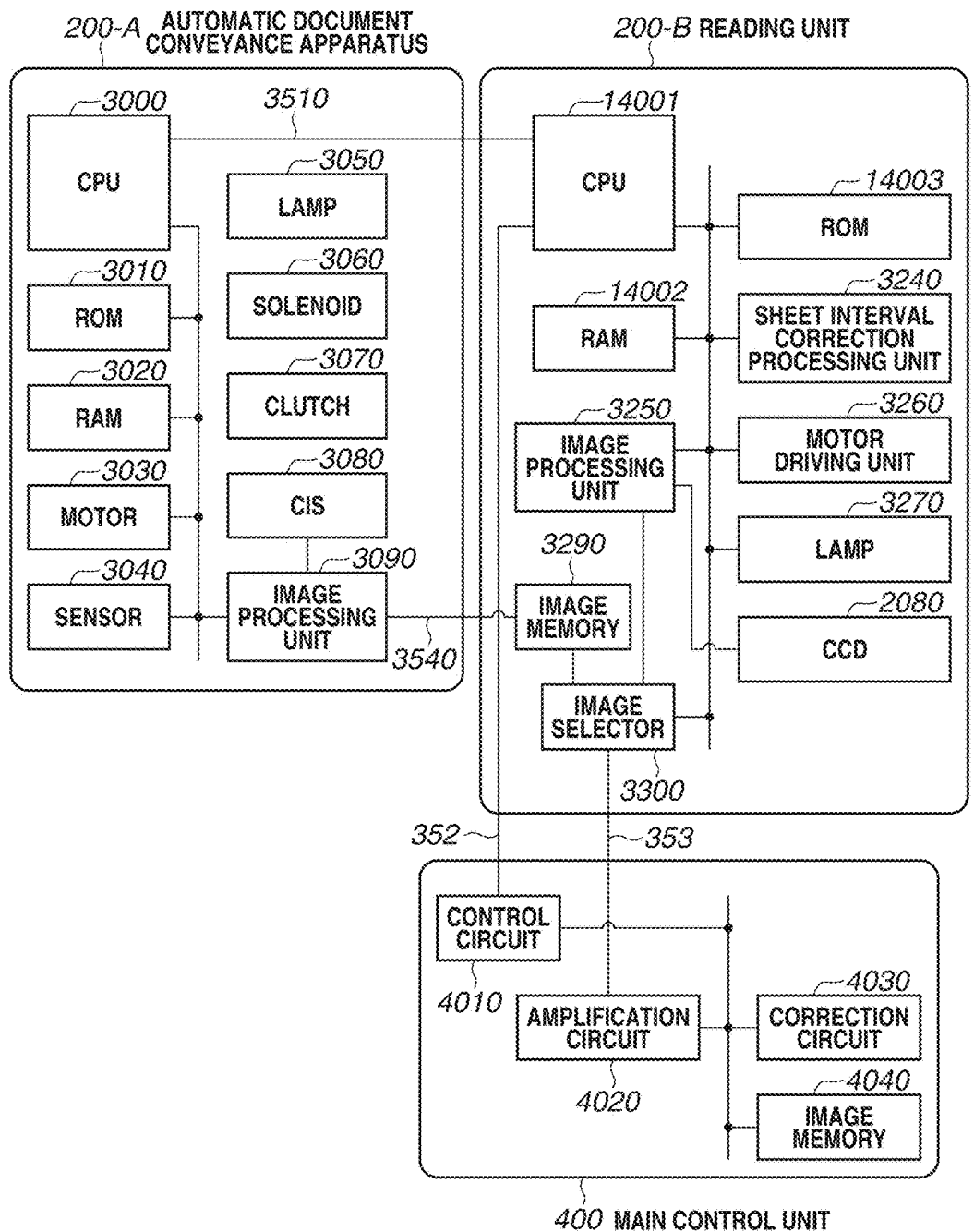
FIG. 4 is a block diagram illustrating the reading unit according to one or more aspects of the present disclosure.

FIG. 4 is a block diagram illustrating the reading unit. FIG. 4 includes a control block diagram illustrating an automatic document conveyance apparatus 200-A.

The automatic document conveyance apparatus 200-A includes a CPU 3000, which is a central processing unit, a ROM 3010, a RAM 3020, an output port, and an input port. The ROM 3010 stores control programs, and the RAM 3020 stores input data and working data. The output port is connected to a motor 3030, a solenoid 3060, and a clutch 3070 for driving various rollers for conveyance. The input port is connected to various sensors 3040 (not illustrated).

The CPU 3000 controls sheet conveyance according to a control program stored in the ROM 3010 connected to the CPU 3000 via a bus. The CPU 3000 performs serial communication with a CPU 14001, which is a central processing unit of a reading unit 200-B, via a line 3510 to transmit and receive control data to and from the reading unit 200-B. Further, a notification of a drawing point signal as a reference of a leading edge of front-surface document image data is also transmitted to the reading unit 200-B via a communication line.

FIG. 4 further includes a control block diagram illustrating a reading unit 200-B. In the reading unit 200-B, the CPU 14001 comprehensively controls the reading unit 200-B. The CPU 14001 is connected to a ROM 14003, which is a program storage ROM, and a RAM 14002, which is a work RAM. A motor driving unit 3260 is a driver circuit configured to drive an optical system driving motor. The reading unit 200-B is connected to a lamp 3270 and a CCD 2080, which is a front-surface image reading unit. The CPU 14001 controls the reading unit 200-B using the motor driver unit 3260, the CCD 2080, etc. A sheet interval correction processing unit 3240 performs sheet interval correction. An image signal of an image formed on the CCD 2080 by a lens is converted into digital image data, and an image processing unit 3250 performs various types of image processing on the digital image data. An image processed by an image processing unit 3090 included in the automatic document conveyance apparatus 200-A is stored in an image memory 3290 via an image communication line 3540. An image selector 3300 selects one of a front-surface image transmitted via the image processing unit 3250 and a back-surface image stored in the image memory 3290, and the selected image is transmitted to the main control unit 400 via the main control unit-reading unit I/F 353.

The notification of the drawing point signal as a reference of a leading edge of front-surface document image data is transmitted to the main control unit 400 via the main control unit-reading unit I/F 353 at a timing timed by the CPU 14001. Similarly, a notification of a drawing point signal from the automatic document conveyance apparatus 200-A via the communication line is also transmitted to the main control unit 400 via the main control unit-reading unit I/F 353 at a timing timed by the CPU 14001 of the reading unit 200-B.

During document image scanning, the CCD 2080 and a contact image sensor (CIS) 3080 respectively output analog image signals for each one reading line, and the output signals are respectively transmitted to the main control unit 400 via the image processing units 3250 and 3090. The signals are amplified by an amplification circuit 4020 and then transmitted to a correction circuit 4030. Then, the correction circuit 4030 performs correction processing on the image signals and writes the corrected signals to an image memory unit 4040. The foregoing processing is performed for a document image region to form a read document image.

While the CIS 3080 is used as a back-surface image reading unit of the automatic document conveyance apparatus 200-A and the CCD 2080 as a front-surface image reading unit of the image reading apparatus 200-B in the present exemplary embodiment, any image reading sensors can be used.

<Flow of Different Size Mixed Documents Reading in which Whether Automatic Zoom Function (Automatic Magnification Function) is Set is not Considered>

First, an example in which whether an automatic zoom function is set is not considered will be described below with reference to FIGS. 8, 9, 10, 11, and 12.

Figure 8:
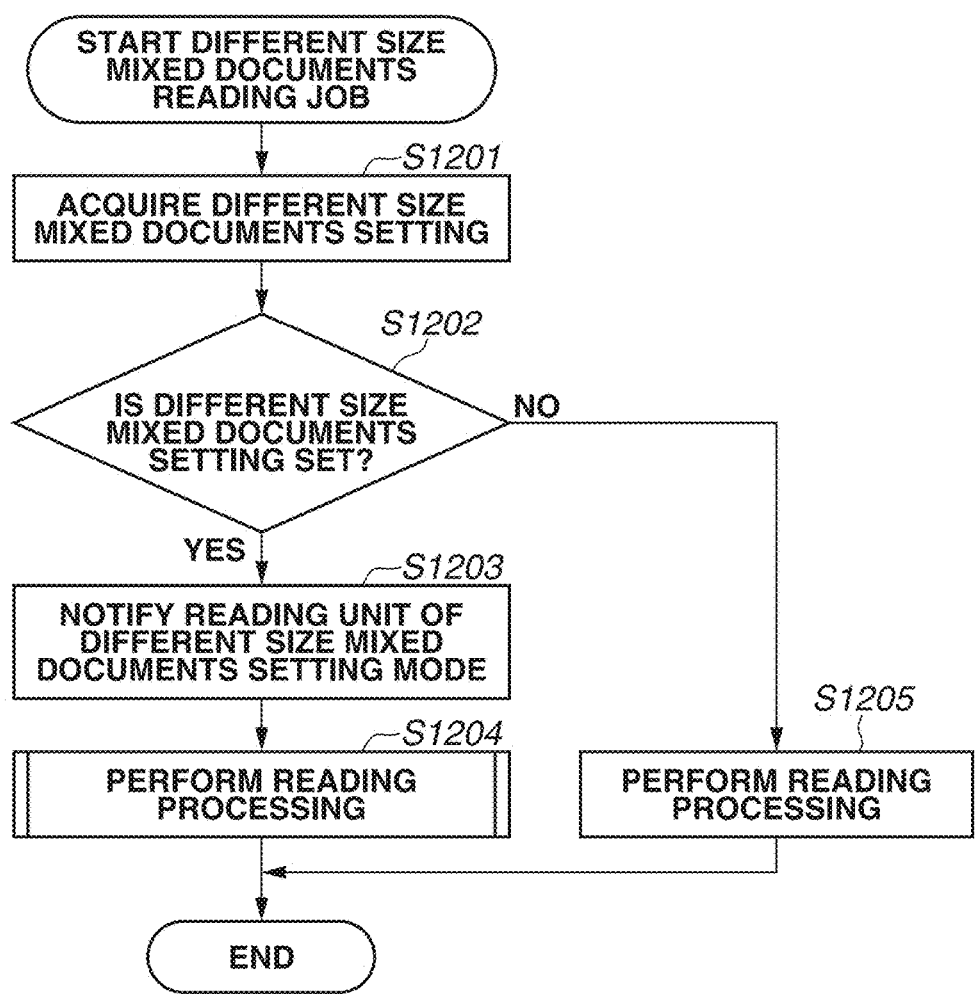
FIG. 8 is a flowchart illustrating different size mixed documents reading performed by a main control unit in which magnifying is not considered according to one or more aspects of the present disclosure.

FIG. 8 is a flowchart illustrating different size mixed documents reading performed by the main control unit 400 in which magnifying is not considered.

The CPU 2100 of the main control unit 400 sequentially reads programs stored in the ROM 2120 or the HDD 2130 into the RAM 2110, and executes the read programs to realize processing illustrated in the flowchart.

Figure 5A:
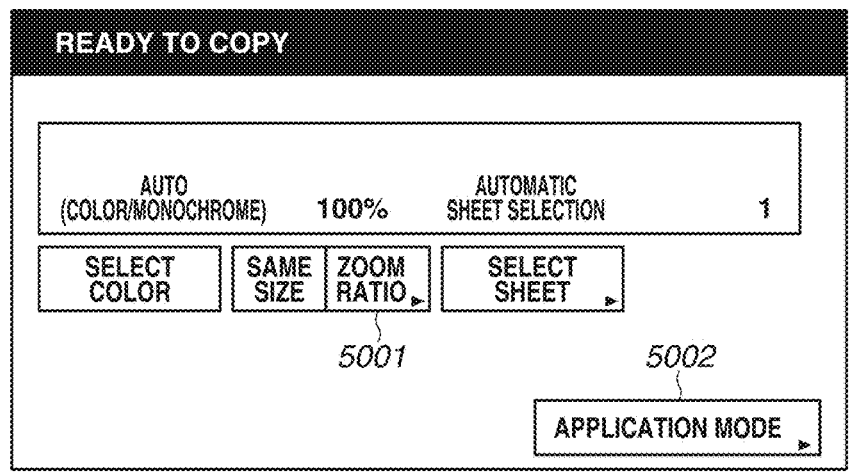
FIGS. 5A, 5B, and 5C illustrate an example of a copy job setting screen (magnification and application) according to one or more aspects of the present disclosure.
Figure 5B:
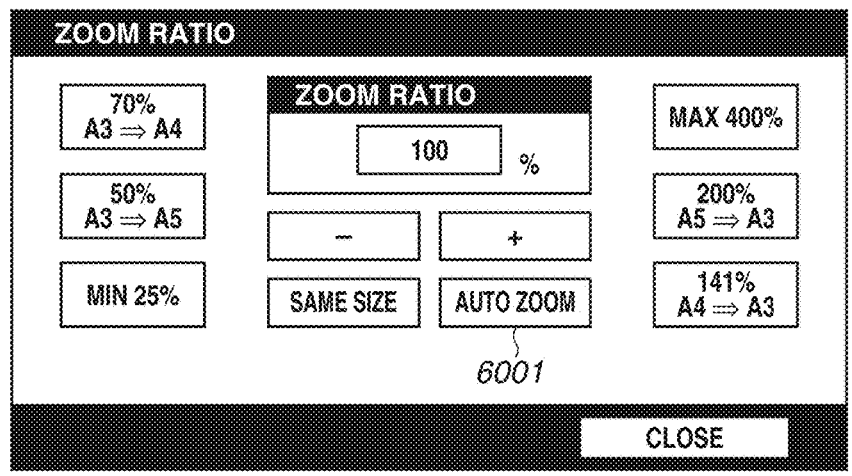
Figure 5C:
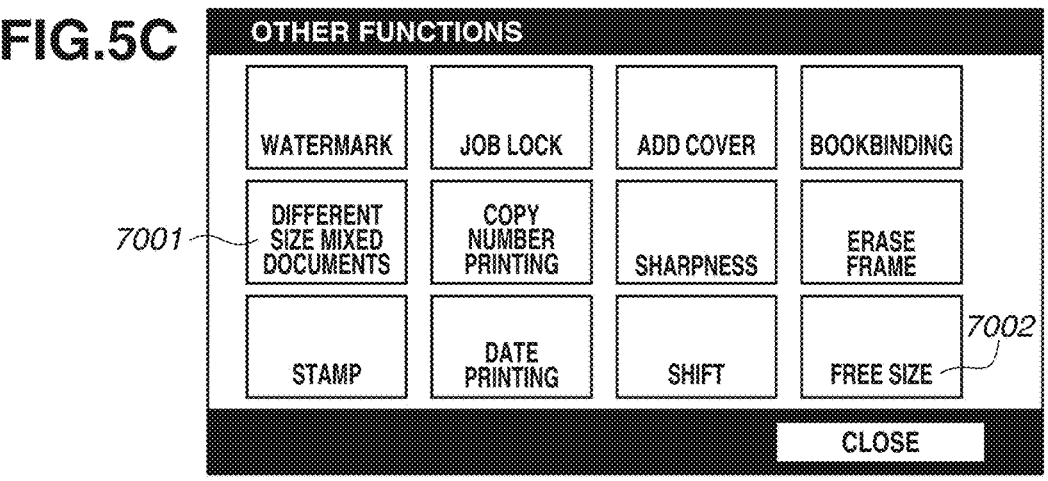

In step S1201, information about whether a different size mixed documents setting is set is acquired. The different size mixed documents setting in a copy job is set, for example, as follows. First, a user presses an application mode setting button 5002 on a copy job setting screen illustrated in FIG. 5A. Then, the user presses a different size mixed documents mode setting button 7001 on a copy job application mode setting screen illustrated in FIG. 5C to set the different size mixed documents setting. A set value is held in the RAM 2110.

A step to which the processing proceeds from step S1202 depends on the information acquired in step S1201. In a case where the different size mixed documents setting is set (YES in step S1202), the processing proceeds to step S1203, and a notification that a different size mixed documents mode is set is transmitted to the reading unit via the main control unit (a control circuit 4010)—reading unit I/F 352. In step S1204 following step S1203, reading processing is performed. On the other hand, in step S1202, in a case where it is determined that the different size mixed documents setting is not set (NO in step S1202), the processing proceeds to step S1205, and reading processing is performed. Details of subroutine step S1204 will be described below with reference to FIG. 9.

Figure 9:
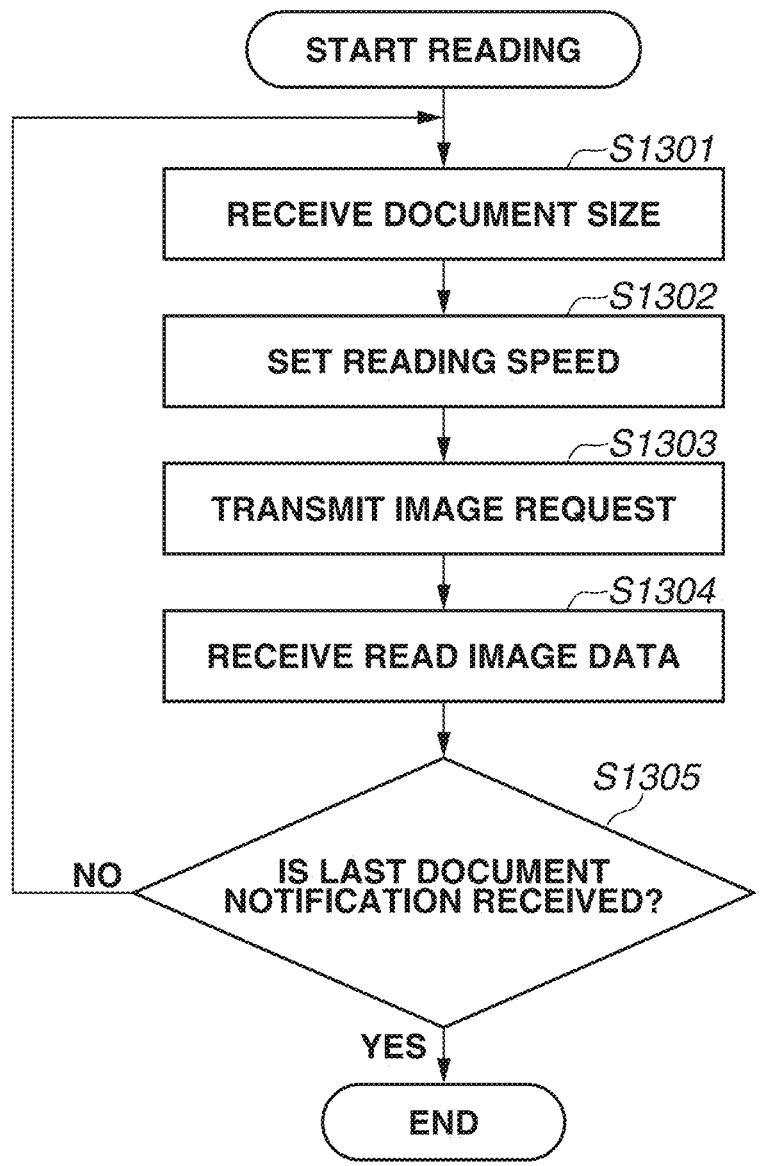
FIG. 9 is a flowchart illustrating reading processing in the different size mixed documents reading performed by the main control unit according to one or more aspects of the present disclosure.

FIG. 9 is a flowchart illustrating the reading processing in the different size mixed documents reading performed by the main control unit 400. The CPU 2100 of the main control unit 400 sequentially reads programs stored in the ROM 2120 or the HDD 2130 into the RAM 2110 and executes the read programs to realize processing illustrated in the flowchart.

In step S1301, a document size detected by the reading unit is received via the main control unit-reading unit I/F 352.

In step S1302, a reading speed is calculated from the document size received in step S1301 and a job set value, and the calculated reading speed is set to the reading unit via the main control unit-reading unit I/F 352. The job set value is, for example, an operation mode which is settable by a user on a screen illustrated in FIG. 5B or 5C. In a case in which an automatic zoom function 6001 described below is not set, all documents included in the same set of documents are read at the same reading speed. Specifically, the CPU 2100 does not perform control for changing the conveyance speed of a document included in the same set of documents. Thus, a document reading operation is performed at a constant conveyance speed.

In step S1303, a notification of an image request is transmitted to the reading unit via the main control unit-reading unit I/F 352. While steps S1302 and S1303 are separately described for the purpose of explanation in the present exemplary embodiment, the transmission in step S1302 and the transmission in step S1303 are performed based on the same command.

In step S1304, read image data is received via the main control unit-reading unit I/F 353. In step S1305, after image data of one document is completely received, whether a last document notification is received from the reading unit is checked. In a case where no last document notification is received, i.e., in a case where there is a next document (NO in step S1305), the processing returns to step S1301 to continue the reading processing. On the other hand, in a case where a last document notification is received (YES in step S1305), the reading processing ends.

Figure 10:
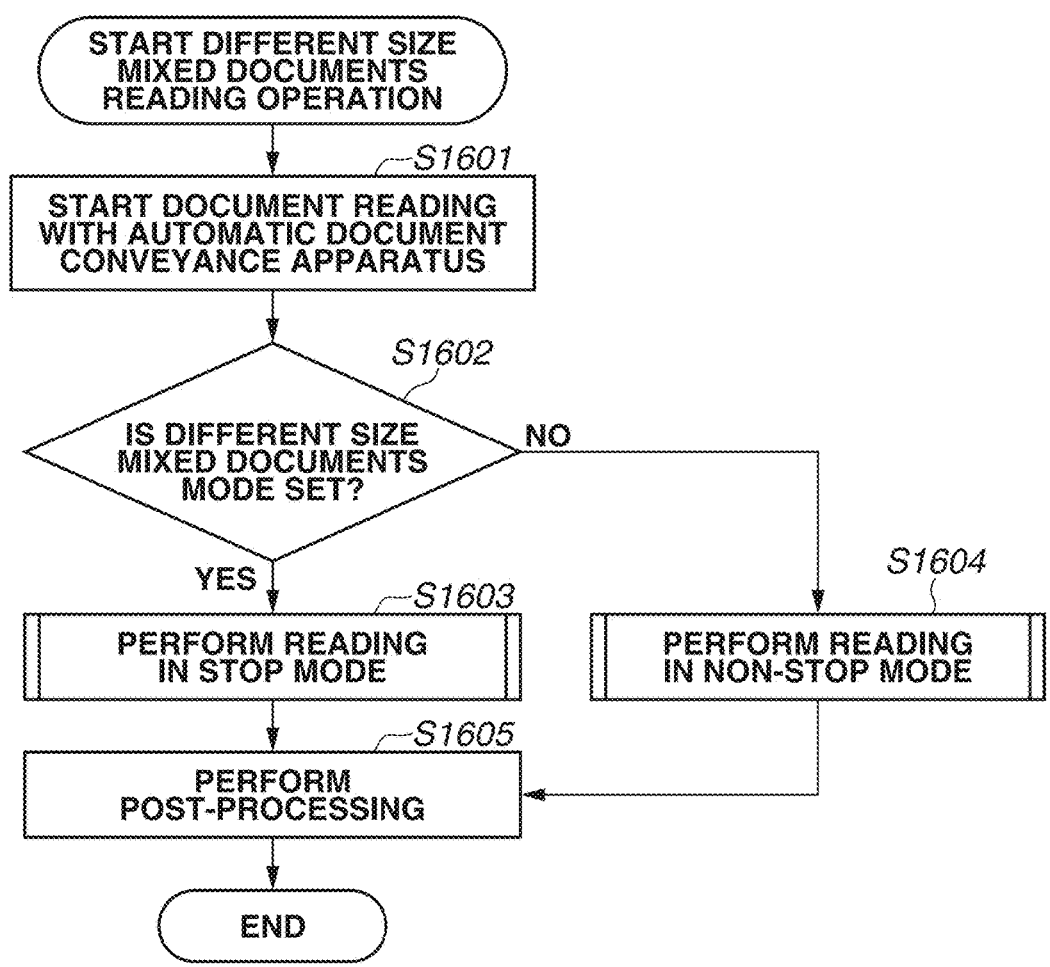
FIG. 10 is a flowchart illustrating the different size mixed documents reading performed by the reading unit in which a speed-fixed mode is not considered according to one or more aspects of the present disclosure.

FIG. 10 is a flowchart illustrating the different size mixed documents reading performed by the reading unit in which a speed-fixed mode (described below) is not considered.

The CPU 14001 of the reading unit and the CPU 3000 sequentially read programs stored in the ROMs 14003 and 3010 into the RAMS 14002 and 3020, and execute the read programs to realize processing illustrated in the flowchart.

In step S1601, document reading with the automatic document conveyance apparatus 200-A starts.

In step S1602, whether the different size mixed documents mode, which is set from the main control unit 400 in step S1203, is set is checked. In a case where the different size mixed documents mode is set (YES in step S1602), the reading speed may be changed for each document, so the processing proceeds to subroutine step S1603, and the reading is performed in a stop mode.

Details of subroutine step S1603 will be described below with reference to FIG. 11. On the other hand, in a case where the different size mixed documents mode is not set (NO in step S1602), the processing proceeds to subroutine step S1604, and the reading is performed in a non-stop mode.

Details of subroutine step S1604 will be described below with reference to FIG. 12. When the reading completes, the processing proceeds to step S1605, and post-processing is performed.

Figure 11:
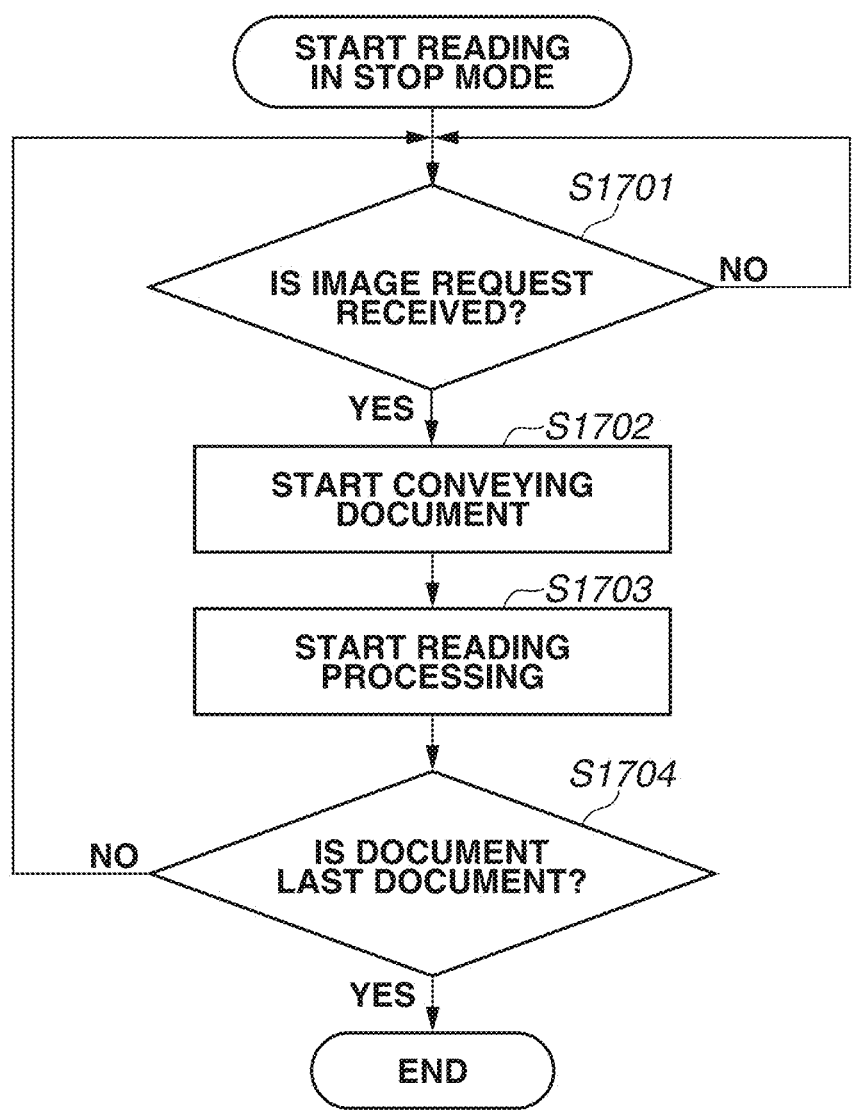
FIG. 11 is a flowchart illustrating reading in a stop mode performed by the reading unit according to one or more aspects of the present disclosure.

FIG. 11 is a flowchart illustrating the reading in the stop mode performed by the reading unit.

The CPU 14001 of the reading unit and the CPU 3000 sequentially read programs stored in the ROMs 14003 and 3010 into the RAMS 14002 and 3020, and execute the read programs to realize processing illustrated in the flowchart.

In step S1701, reception of the notification of the image request transmitted from the main control unit 400 in step S1303 is awaited. As described above, the image request transmitted in step S1303 includes the reading speed information calculated in step S1302.

In step S1702, document conveyance starts based on the reading speed information received in step S1701. When a document arrives at a reading start position, then in step S1703, the reading processing starts, and read image data is transmitted to the main control unit 400 via the main control unit-reading unit I/F 353. When one surface of the document is completely read, the processing proceeds to step S1704, and whether the document is the last document is checked. In a case where the document is not the last document (NO in step S1704), the processing returns to step S1701, and the reading processing continues. On the other hand, in a case where the document is the last document (YES in step S1704), a last document notification is transmitted to the main control unit 400 via the main control unit-reading unit I/F 352, and the reading processing ends.

Figure 13:
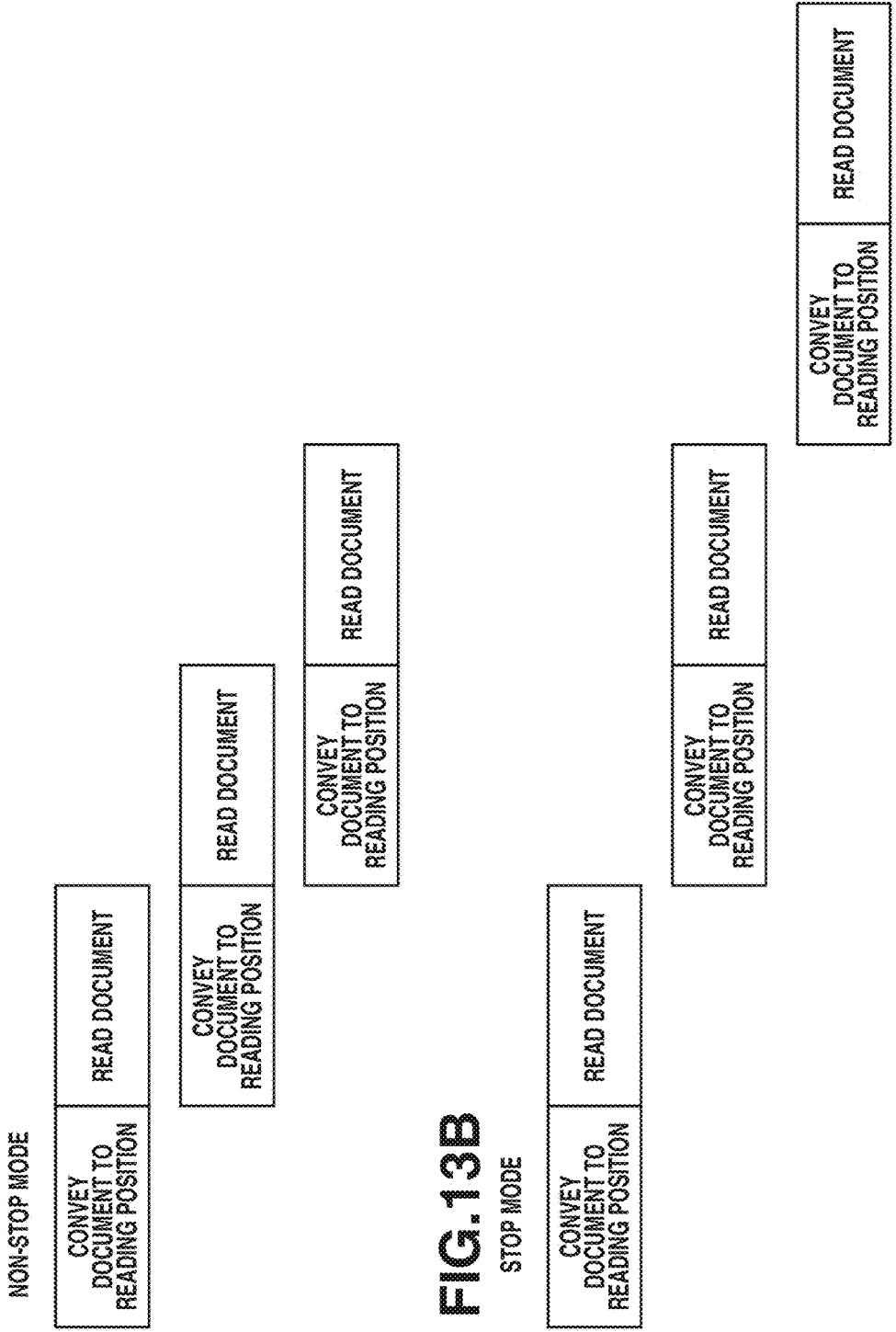
FIGS. 13A and 13B illustrate timings in the non-stop mode and the stop mode according to one or more aspects of the present disclosure.

The following describes timings in a case where the reading is performed in the stop mode with reference to FIG. 13B. The reading processing is mainly divided into document conveyance to a reading position and reading processing. In the case of the different size mixed documents, the reading speed may be changed for each document, so that conveyance of a next document cannot start until the main control unit 400 completely reads a previous document and the reading speed for the next document is fixed. This increases intervals between the documents to decrease performance.

Figure 12:
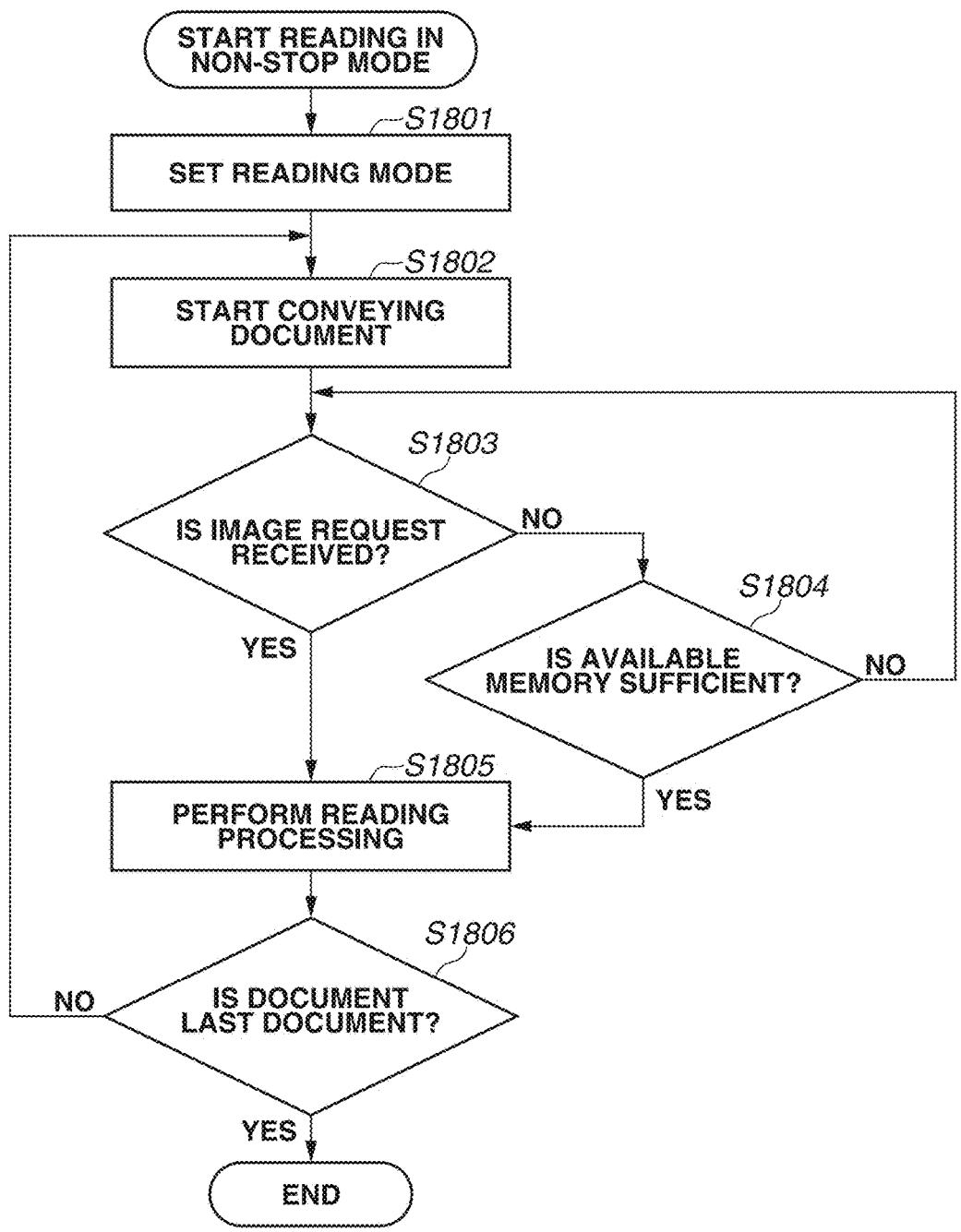
FIG. 12 is a flowchart illustrating reading in a non-stop mode performed by the reading unit according to one or more aspects of the present disclosure.

FIG. 12 is a flowchart illustrating the reading in the non-stop mode performed by the reading unit. The CPU 14001 of the reading unit and the CPU 3000 sequentially read programs stored in the ROMs 14003 and 3010 into the RAMS 14002 and 3020, and execute the read programs to realize processing illustrated in the flowchart.

In step S1801, a reading mode such as the reading speed is fixed. In a case of the non-stop mode, all documents included in the same set of documents can be read under the same setting. In step S1802, conveyance of a document starts.

In step S1803, whether a notification of an image request signal is received from the main control unit 400 via the main control unit-reading unit I/F 352 is checked. In a case where an image request signal is received (YES in step S1803), the processing proceeds to step S1805. In step S1805, the reading processing starts after the document arrives at the reading start position, and read image data is transmitted to the main control unit 400 via the main control unit-reading unit I/F 353. On the other hand, in a case where no image request signal is received (NO in step S1803), the processing proceeds to step S1804, and available memory of the RAM 3020 is checked. In a case where the available memory is sufficient for an image of one surface (YES in step S1804), the processing proceeds to step S1805 without waiting for an image request signal, and reading is performed. On the other hand, if the available memory is insufficient, the document stops at the reading position, and the processing returns to step S1803 to wait for an image request signal.

If one surface of the document is completely read in step S1805, the processing proceeds to step S1806, and whether the document is the last document is checked. In a case where the document is not the last document (NO in step S1806), the processing returns to step S1801, and the reading processing continues. On the other hand, in a case where the document is the last document (YES in step S1806), a last document notification is transmitted to the main control unit 400 via the main control unit-reading unit I/F 353, and the reading processing ends.

Figure 17:
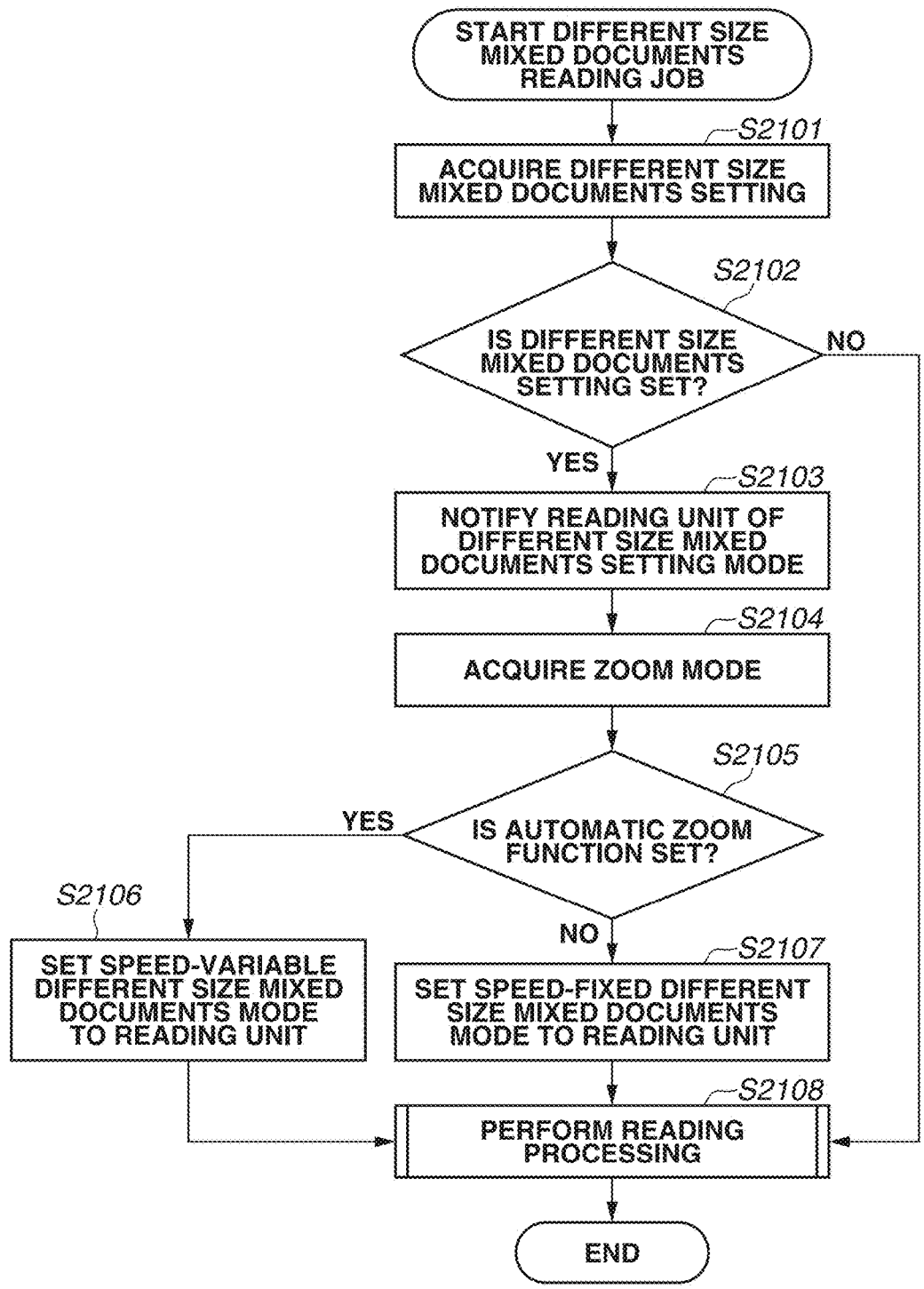
FIG. 17 is a flowchart illustrating the different size mixed documents reading performed by the main control unit in which the magnifying is considered according to one or more aspects of the present disclosure.
Figure 18:
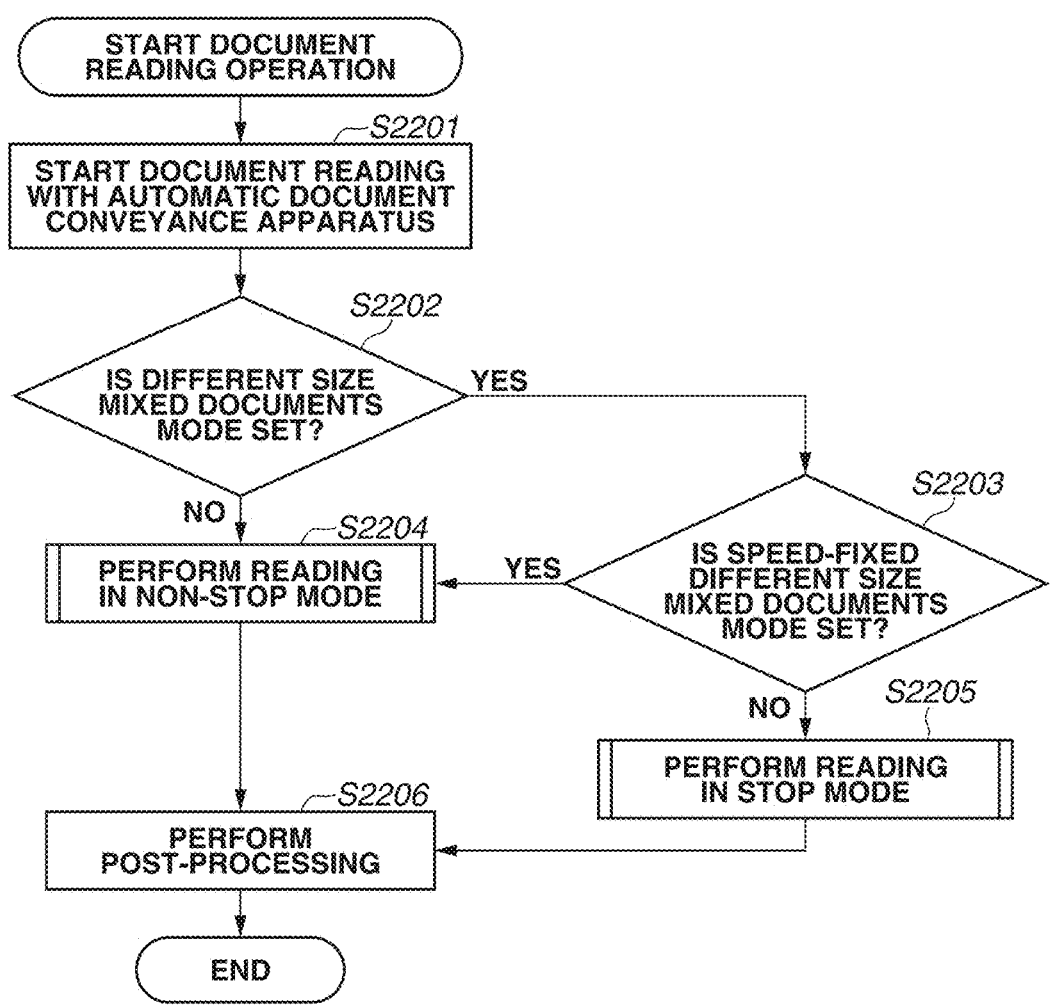
FIG. 18 is a flowchart illustrating the different size mixed documents reading performed by the main control unit in which the speed-fixed mode is considered according to one or more aspects of the present disclosure.

The following describes timings in a case where the reading is performed in the non-stop mode with reference to FIG. 13A. The reading processing is mainly divided into the document conveyance to the reading position and the reading processing. Since the reading speed is not changed for each document, conveyance of a next document can start while a previous document is being read. This enables the reading processing and the next document conveyance processing to be performed in parallel, so that intervals between the documents are decreased to improve performance. Accordingly, if whether the automatic magnification function is set is not considered, as illustrated in FIG. 10, the reading is always performed in the stop mode when the different size mixed documents reading mode is set. In the present exemplary embodiment, a method described below with reference to FIGS. 17 and 18 is used to improve performance.

<Flow of Long Document Reading in which Job Type is not Considered>

Figure 14:
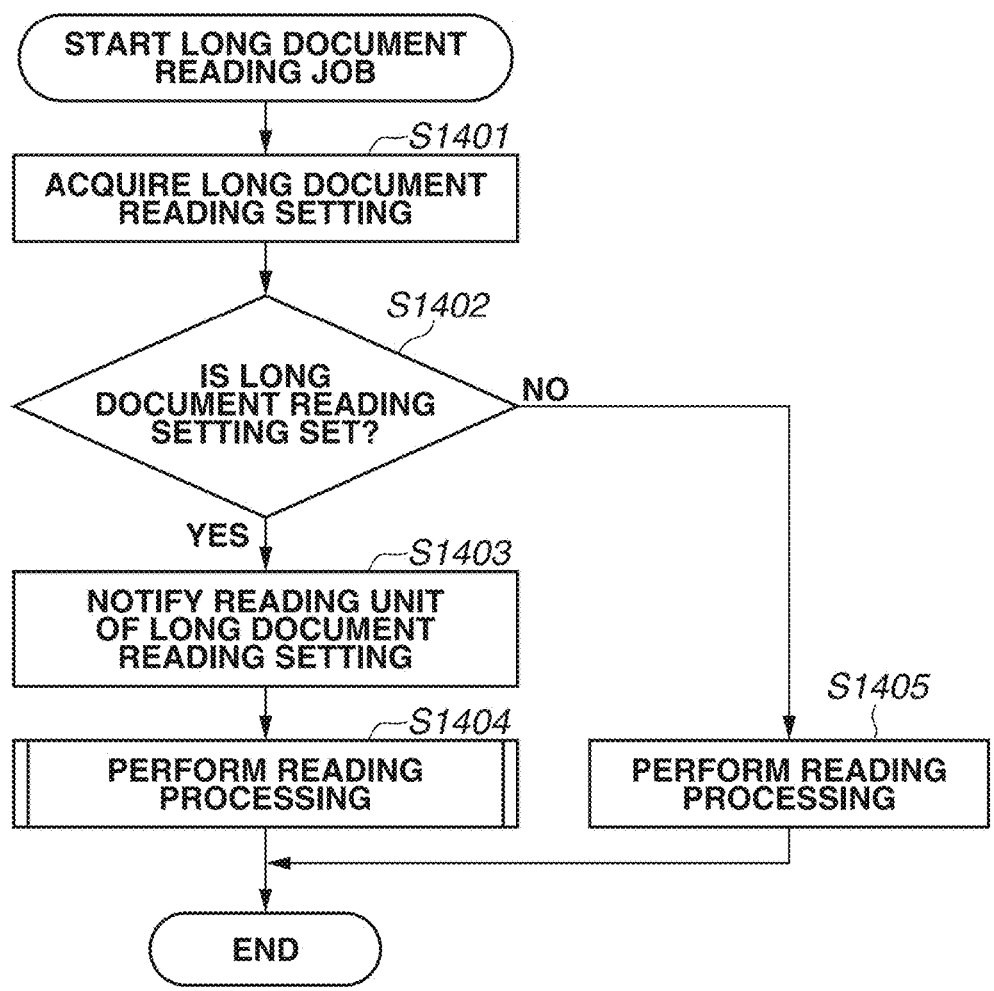
FIG. 14 is a flowchart illustrating long document reading performed by the main control unit in which a job type is not considered according to one or more aspects of the present disclosure.
Figure 15:
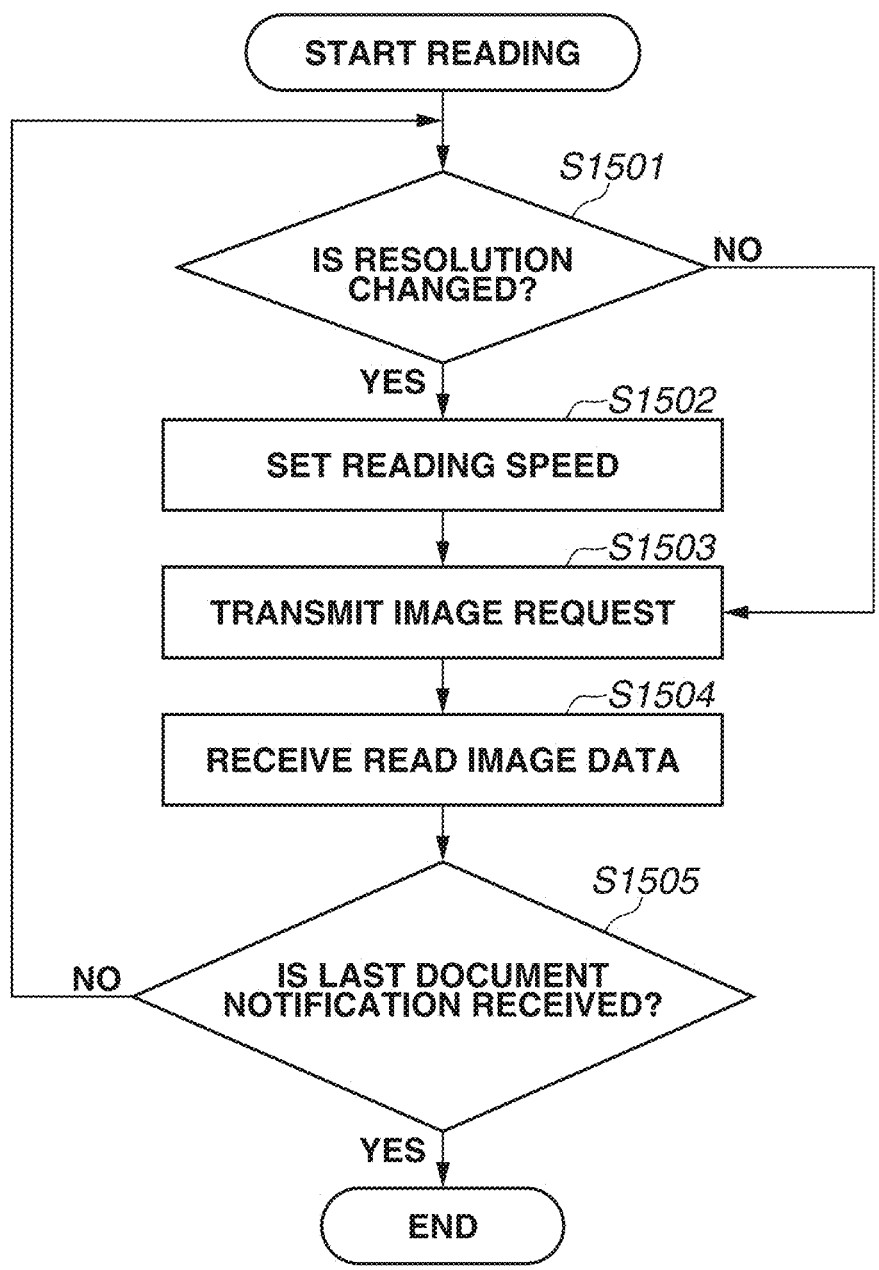
FIG. 15 is a flowchart illustrating reading processing in the long document reading performed by the main control unit according to one or more aspects of the present disclosure.
Figure 16:
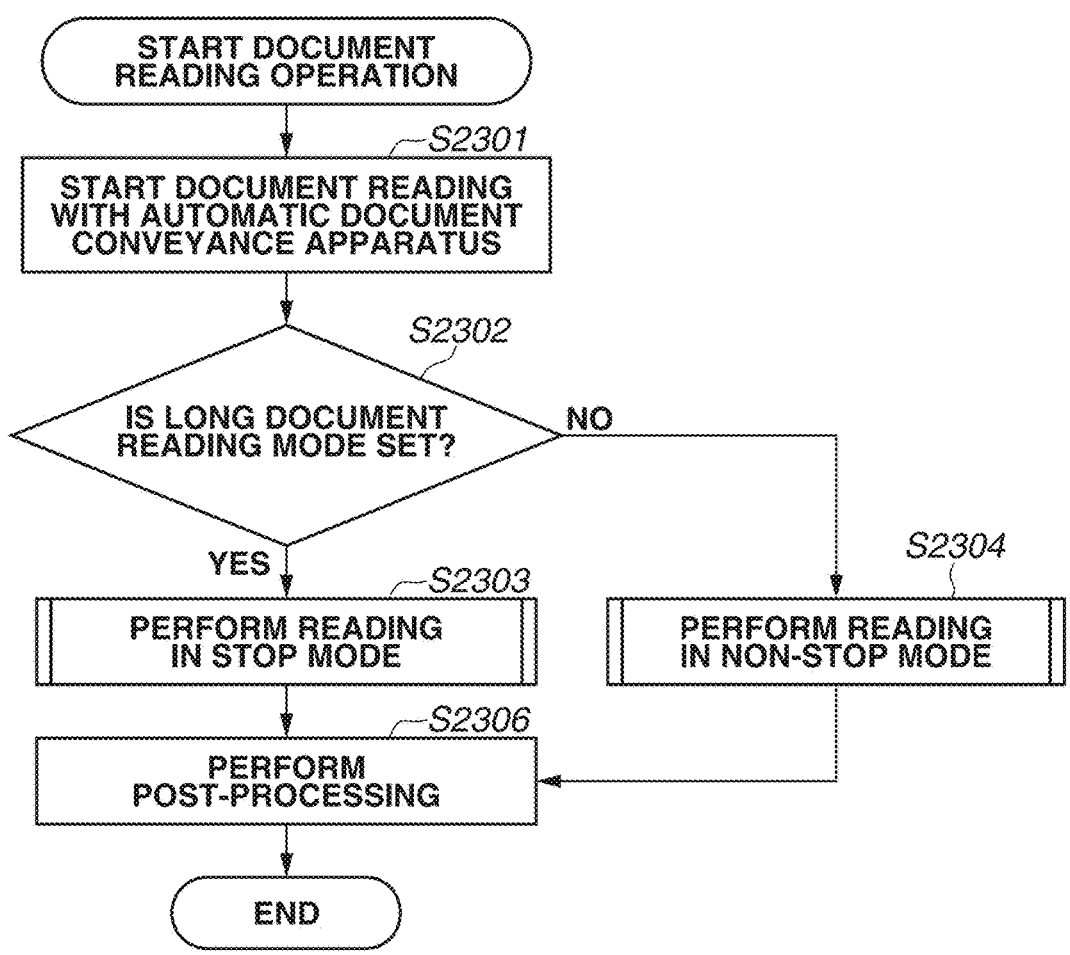
FIG. 16 is a flowchart illustrating the long document reading performed by the reading unit in which a speed-fixed mode is not considered according to one or more aspects of the present disclosure.

The following describes why the performance of long document reading is decreased when a job type is not considered, with reference to FIGS. 14 to 16.

FIG. 14 is a flowchart illustrating the long document reading performed by the main control unit 400 in a case where a job type is not considered.

The CPU 2100 of the main control unit 400 sequentially reads programs stored in the ROM 2120 or the HDD 2130 into the RAM 2110, and executes the read programs to realize processing illustrated in the flowchart.

Figure 6A:
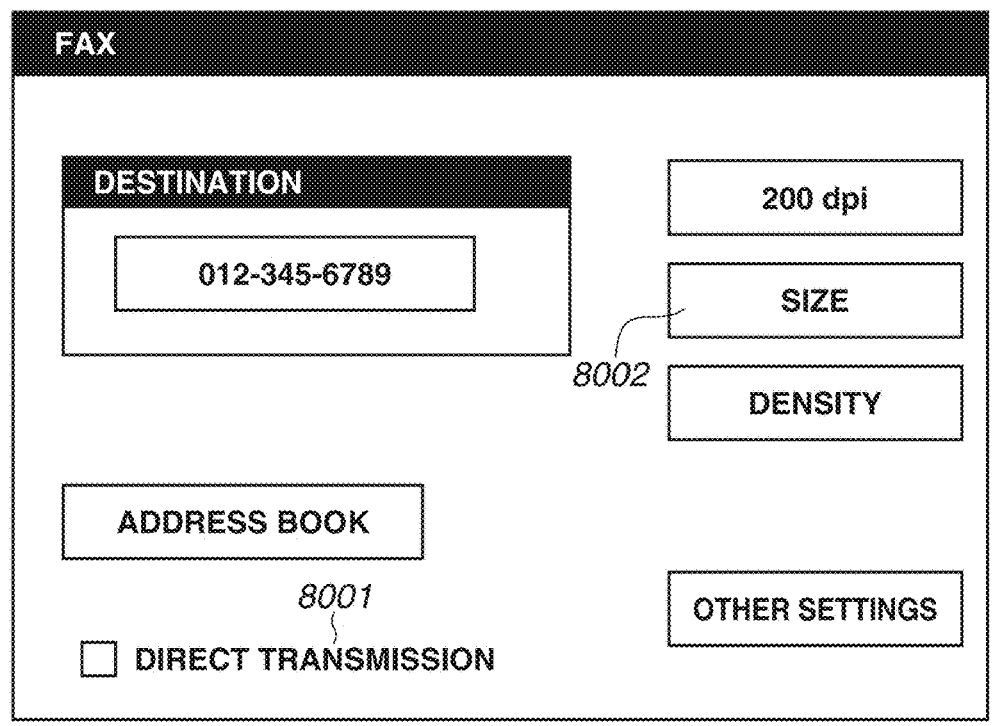
FIGS. 6A and 6B illustrate an example of a fax job setting screen (size) according to one or more aspects of the present disclosure.
Figure 6B:
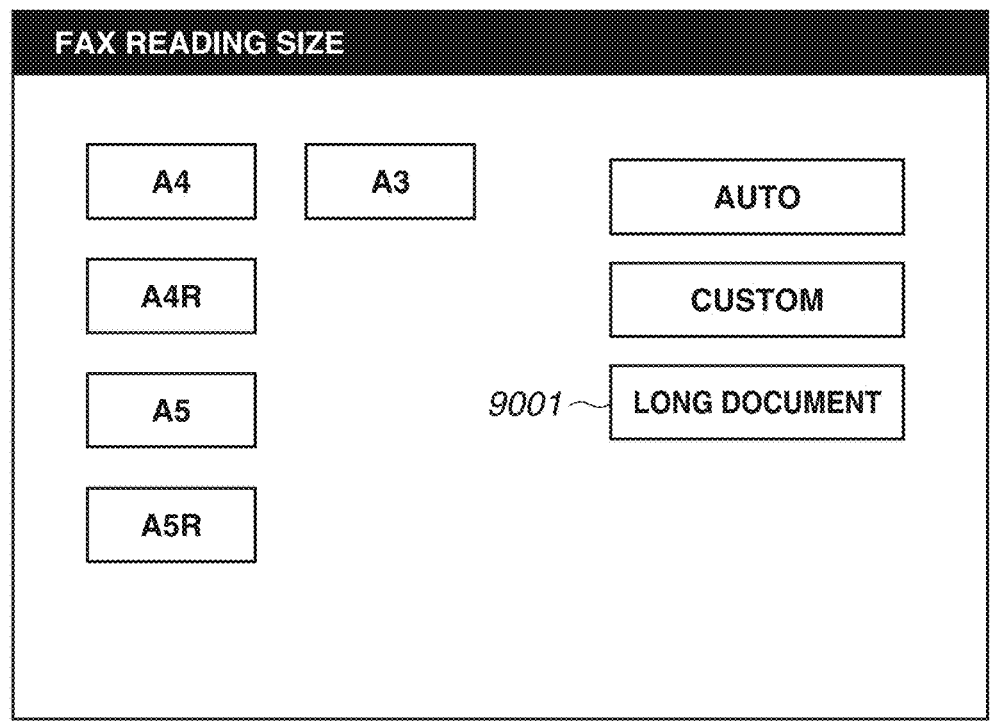

In step S1401, information about whether a long document reading setting is set is acquired. In an example of a setting method in a copy job, a user presses the application mode setting button 5002 on the copy job setting screen illustrated in FIG. 5A and then presses a free size setting button 7002 on the copy job application mode setting screen illustrated in FIG. 5C to set the long document reading setting. In an example of a setting method in a fax transmission job, a user presses a size setting button 8002 on a fax job setting screen illustrated in FIG. 6A and then presses a long document button 9001 on a fax job size setting screen illustrated in FIG. 6B to set the long document reading setting. When a direct transmission setting checkbox 8001 on the fax job setting screen illustrated in FIG. 6A is checked, the job type is set to a direct fax (direct fax transmission job), and the reading size is automatically set to a long document. A set value is held in the RAM 2110. The direct fax refers to a function of dialing to connect to a line before image reading to be ready for fax transmission and then repeating document reading and document image transmission for each document.

A step to which the processing proceeds from step S1402 depends on the information acquired in step S1401. In a case where the long document reading setting is not set (NO in step S1402), the processing proceeds to step S1405, and reading processing is performed. On the other hand, in a case where the long document reading setting is set (YES in step S1402), the processing proceeds to step S1403, and a notification of the long document reading setting is transmitted to the reading unit via the main control unit-reading unit I/F 352. Then, in subroutine step S1404, long document reading processing is performed. Details of subroutine step S1404 will be described below with reference to FIG. 15.

FIG. 15 is a flowchart illustrating the reading processing in the long document reading performed by the main control unit 400.

The CPU 2100 of the main control unit 400 sequentially reads programs stored in the ROM 2120 or the HDD 2130 into the RAM 2110, and executes the read programs to realize processing illustrated in the flowchart.

Figure 7A:
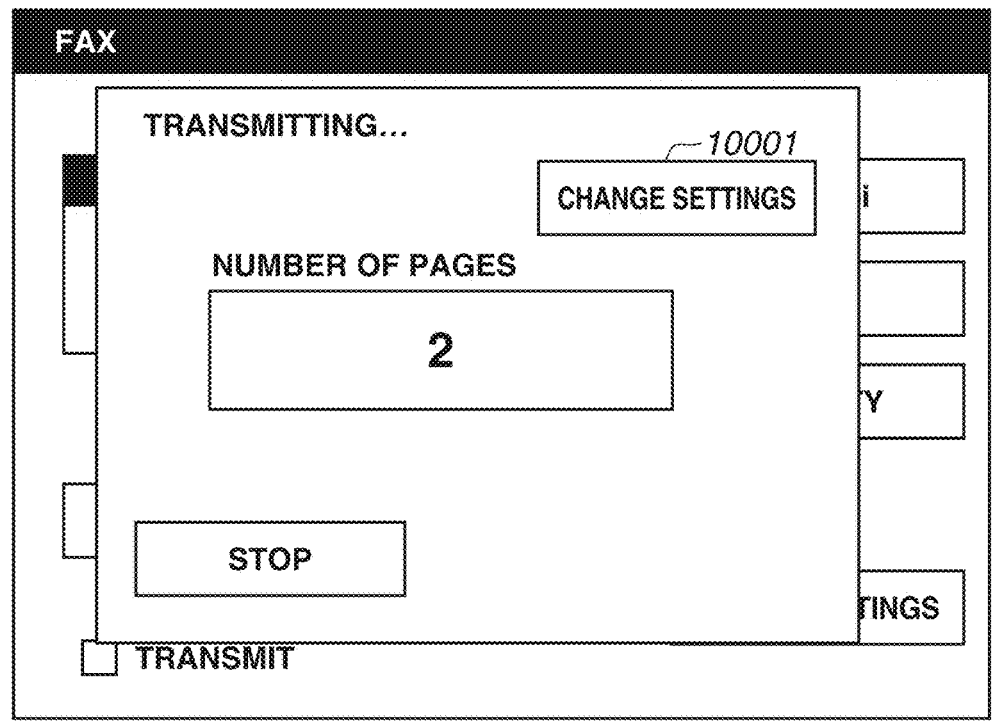
FIGS. 7A and 7B illustrate an example of a screen displayed during fax job transmission according to one or more aspects of the present disclosure.
Figure 7B:
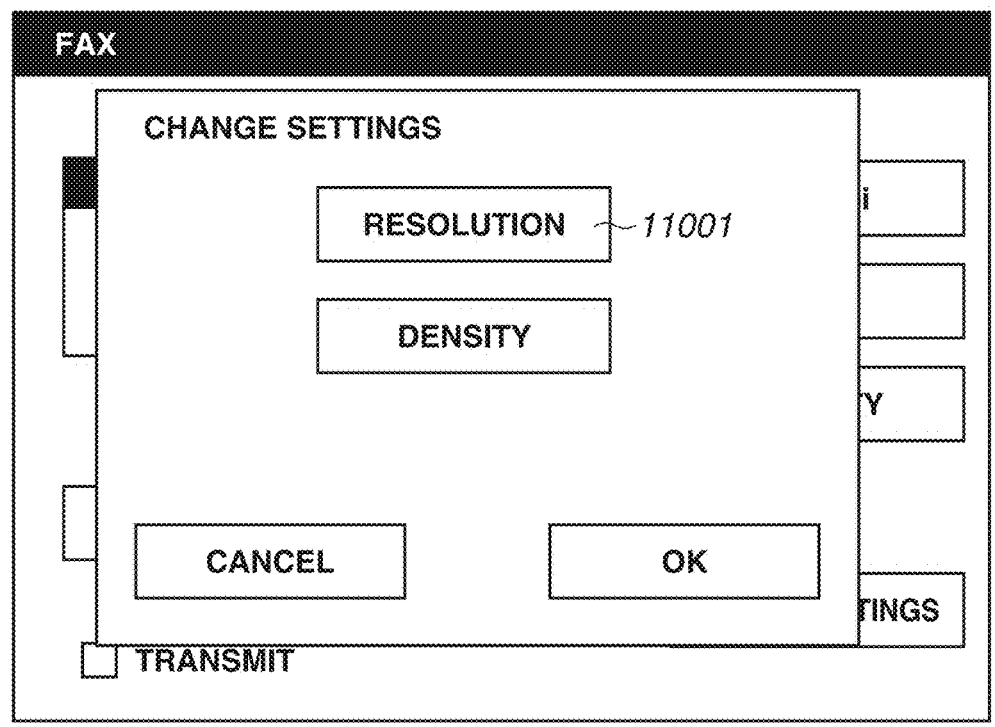

In step S1501, whether a reading resolution is changed is checked. The reading resolution setting is changed not every time the long document reading is performed. The reading resolution is changeable only in a case of direct fax transmission. The reading resolution can be changed in the middle of a job by pressing a resolution setting change button 11001 on a setting change screen illustrated in FIG. 7B, which opens at the press of a setting change button 10001 on a screen indicating that direct fax transmission is being performed as illustrated in FIG. 7A. For example, a selected reading resolution is received for each page, and the CPU 2100 performs control such that each document is read at the received reading resolution. The reading speed is changed according to the reading resolution. If the reading resolution is low, the reading speed is high. On the other hand, if the reading resolution is high, the reading speed is low. In the direct fax transmission, as described above, the reading resolution may be changed for each document in the middle of a job, and the reading speed may be changed according to the reading resolution. Further, a direct fax is generally read in the long document reading (free size) mode. In step S1502, the reading speed is calculated from the reading resolution checked in step S1501, and the calculated reading speed is set to the reading unit via the main control unit-reading unit I/F 352. As described above, in the cases other than the case of a direct fax transmission job, the reading speed is the same for all documents in the same set of documents.

In step S1503, a notification of an image request is transmitted to the reading unit via the main control unit-reading unit I/F 352. While steps S1502 and S1503 are separately described for the purpose of explanation in the present exemplary embodiment, the transmission in step S1502 and the transmission in step S1503 are performed based on the same command.

In step S1504, read image data is received via the main control unit-reading unit I/F 353.

In step S1505, after image data of one document is completely received, whether a last document notification is received from the reading unit is checked. In a case where no last document notification is received, i.e., in a case where there is a next document (NO in step S1505), the processing returns to step S1501 to continue the reading processing. On the other hand, if a last document notification is received (YES in step S1505), the reading processing ends.

FIG. 16 is a flowchart illustrating the long document reading performed by the reading unit in which a speed-fixed mode (described below) is not considered.

The CPU 14001 of the reading unit and the CPU 3000 sequentially read programs stored in the ROMs 14003 and 3010 into the RAMS 14002 and 3020, and execute the read programs to realize processing illustrated in the flowchart.

In step S2301, document reading with the automatic document conveyance apparatus 200-A starts.

In step S2302, whether a long document reading mode, which is set from the main control unit 400 in step S1403, is set is checked. In a case where the long document reading mode is set (YES in step S2302), the reading speed may be changed for each document, so that the processing proceeds to subroutine step S2303, and reading is performed in the stop mode.

Details of subroutine step S2303 are as described above with reference to FIG. 11. On the other hand, in a case where the long document reading mode is not set (NO in step S2303), the processing proceeds to subroutine step S2304, and reading is performed in the non-stop mode.

Figure 19:
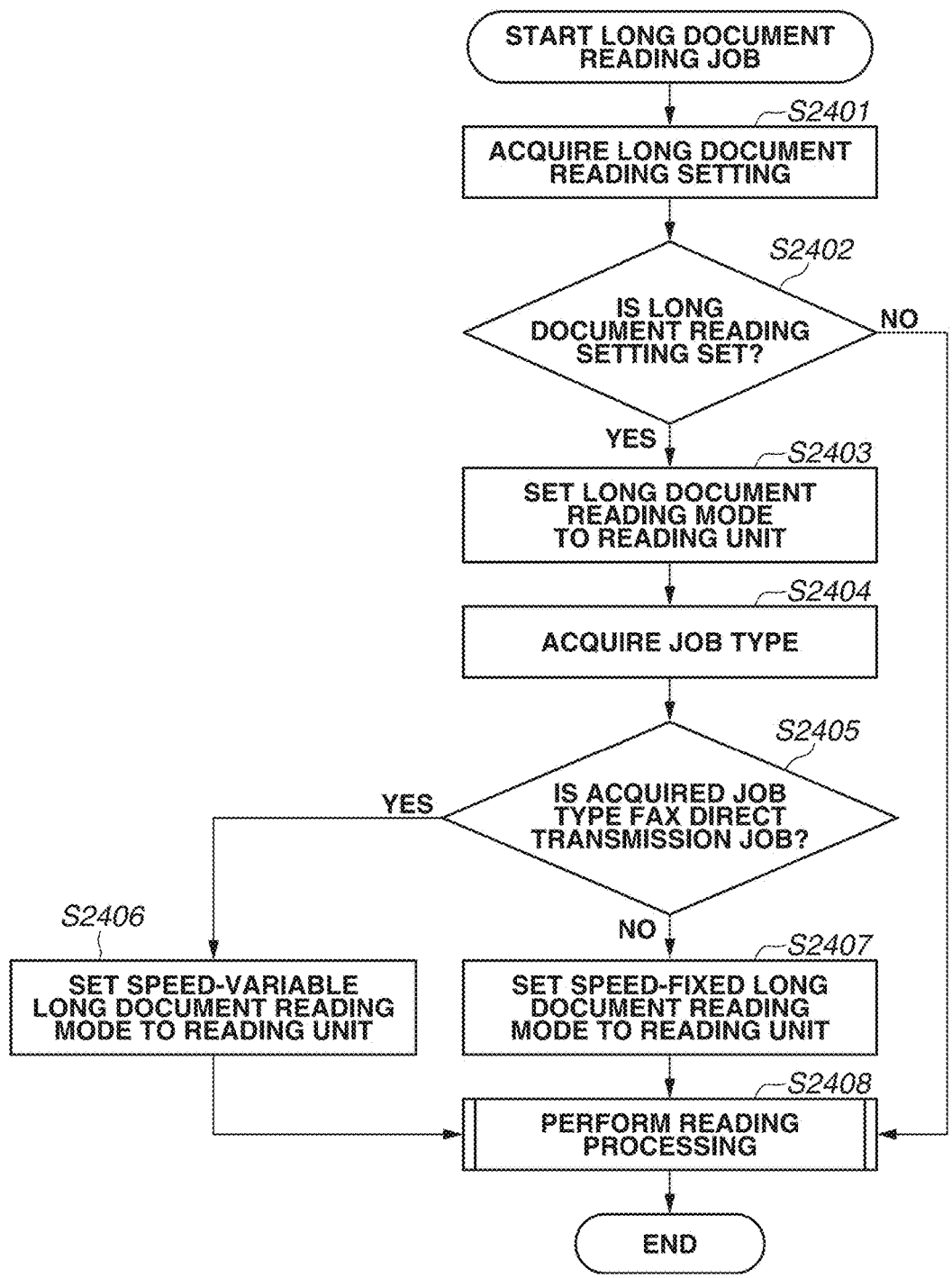
FIG. 19 is a flowchart illustrating the long document reading performed by the main control unit in which the job type is considered according to one or more aspects of the present disclosure.
Figure 20:
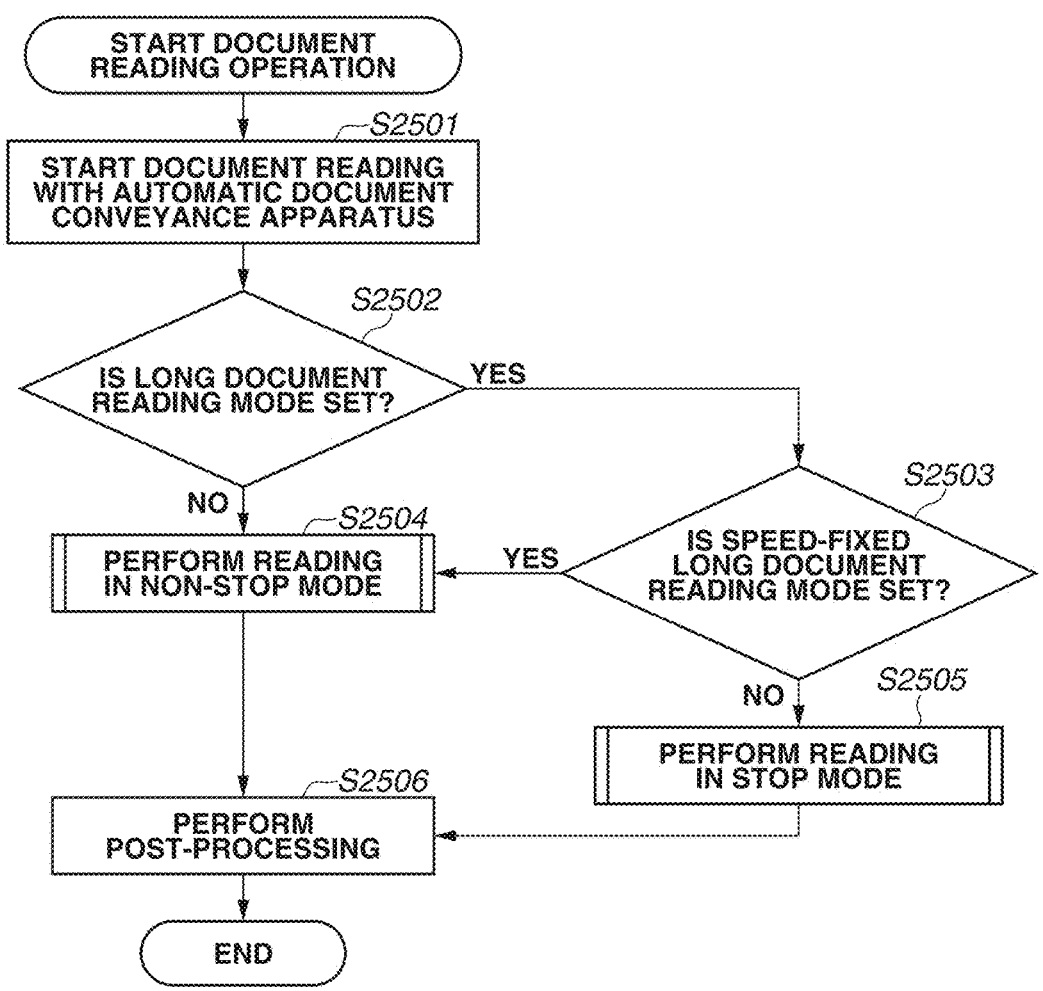
FIG. 20 is a flowchart illustrating the long document reading performed by the reading unit in which the speed-fixed mode is considered according to one or more aspects of the present disclosure.

Details of subroutine step S2304 are as described above with reference to FIG. 12. If the reading completes, then in step S2306, and post-processing is performed. In the present exemplary embodiment, a method described below with reference to FIGS. 19 and 20 is used to prevent a decrease in performance of the long document reading in which the job type is not considered as described above with reference to FIGS. 14 to 16.

<Flow of Different Size Mixed Documents Reading in which Whether Automatic Zoom (Magnification) Function is Set is Considered>

The following describes a method of improving performance of the different size mixed documents reading by considering whether the automatic zoom function is set, with reference to FIGS. 17 and 18.

FIG. 17 is a flowchart illustrating the different size mixed documents reading performed by the main control unit 400 in a case in which the automatic zoom function is considered.

The CPU 2100 of the main control unit 400 sequentially reads programs stored in the ROM 2120 or the HDD 2130 into the RAM 2110, and executes the read programs to realize processing illustrated in the flowchart.

In step S2101, information about whether the different size mixed documents setting is set is acquired. The different size mixed documents setting in a copy job is set, for example, as follows. First, a user presses the application mode setting button 5002 on the copy job setting screen illustrated in FIG. 5A. Then, the user presses the different size mixed documents mode setting button 7001 on the copy job application mode setting screen illustrated in FIG. 5C to set the different size mixed documents setting. A set value is held in the RAM 2110.

A step to which the processing proceeds from step S2102 depends on the information acquired in step S2101. In a case where the different size mixed documents setting is set (YES in step S2102), the processing proceeds to step S2103, and the different size mixed documents mode is set to the reading unit via the main control unit-reading unit I/F 352.

In step S2104, information about whether the automatic zoom function is set is acquired. In an example of a setting method in a copy job, a user presses a zoom setting button 5001 on the copy job setting screen illustrated in FIG. 5A and then presses the automatic zoom setting button 6001 on the copy job zoom setting screen illustrated in FIG. 5B to set the automatic zoom function. A set value is stored in the RAM 2110.

A step to which the processing proceeds from step S2105 depends on the information acquired in step S2104. In a case where the automatic zoom function is set (YES in step S2105), the processing proceeds to step S2106, and a speed-variable different size mixed documents mode is set to the reading unit via the main control unit-reading unit I/F 352. On the other hand, in a case where the automatic zoom function is not set (NO in step S2105), the processing proceeds to step S2107, and a speed-fixed different size mixed documents mode is set to the reading unit via the main control unit-reading unit I/F 352.

In subroutine step S2108, the reading processing is performed. Details of subroutine step S2108 are already described above with reference to FIG. 9.

FIG. 18 is a flowchart illustrating the different size mixed documents reading performed by the reading unit in which the speed-fixed mode is considered.

The CPU 14001 of the reading unit and the CPU 3000 sequentially read programs stored in the ROMs 14003 and 3010 into the RAMS 14002 and 3020, and execute the read programs to realize processing illustrated in the flowchart.

In step S2201, document reading with the automatic document conveyance apparatus 200-A starts. In step S2202, whether the different size mixed documents mode, which is set from the main control unit 400 in step S2103, is set is checked.

In a case where the different size mixed documents mode is set (YES in step S2202), the processing proceeds to step S2203, and the set value of the speed-variable different size mixed documents mode or the speed-fixed different size mixed documents mode set in step S2105 or S2106 from the main control unit 400 is checked.

In a case where the speed-fixed different size mixed documents mode is set (YES in step S2203), the processing proceeds to subroutine step S2204, and reading is performed in the non-stop mode. Details of subroutine step S2204 are already described above with reference to FIG. 12. On the other hand, in a case where the speed-variable different size mixed documents mode is set (NO in step S2203), the processing proceeds to subroutine step S2205, and reading is performed in the stop mode. Details of subroutine step S2205 are already described above with reference to FIG. 11. When the reading completes, the processing proceeds to step S2206, and post-processing is performed.

As described above with reference to FIGS. 17 and 18, even in the different size mixed documents mode, an appropriate reading mode can be selected by considering whether the automatic zoom setting is set, and in the case of the speed-fixed different size mixed documents, the non-stop mode can be selected to improve performance.

<Flow of Long Document Reading in which Job Type is Considered>

A method of improving performance of the long document reading by considering the job type will be described below with reference to FIGS. 19 and 20.

FIG. 19 is a flowchart illustrating the long document reading performed by the main control unit 400 in which the job type is considered. The CPU 2100 of the main control unit 400 sequentially reads programs stored in the ROM 2120 or the HDD 2130 into the RAM 2110, and executes the read programs to realize processing illustrated in the flowchart.

In step S2401, information about whether the long document reading setting is set is acquired. In an example of a setting method in a copy job, a user presses the application mode setting button 5002 on the copy job setting screen illustrated in FIG. 5A and then presses the free size setting button 7002 on the copy job application mode setting screen illustrated in FIG. 5C to set the long document reading setting. In an example of a setting method in a fax transmission job, a user presses the size setting button 8002 on the fax job setting screen illustrated in FIG. 6A and then presses the long document button 9001 on the fax job size setting screen illustrated in FIG. 6B to set the long document reading setting. Further, if the direct transmission setting checkbox 8001 on the fax job setting screen illustrated in FIG. 6A is checked, the job type is set to the direct fax, and the reading size is automatically set to the long document setting. A set value is held in the RAM 2110.

A step to which the processing proceeds from step S2402 depends on the information acquired in step S2401. In a case where the long document reading setting is set (YES in step S2402), the processing proceeds to step S2403, and the long document mode is set to the reading unit via the main control unit-reading unit I/F 352. On the other hand, in a case where the long document reading setting is not set (NO in step S2402), the processing proceeds to step S2408.

In step S2404, a job type is acquired. The job type is held in the RAM 2110.

A step to which the processing proceeds from step S2405 depends on the job type acquired in step S2404. In a case where the job type is a direct fax transmission job (YES in step S2405), the processing proceeds to step S2406, and a speed-variable long document mode is set to the reading unit via the main control unit-reading unit I/F 352. On the other hand, in a case where the job type is a job other than the direct fax transmission job (NO in step S2405), the processing proceeds to step S2407, and a speed-fixed long document mode is set to the reading unit via the main control unit-reading unit I/F 352.

In subroutine step S2408, the long document reading processing is performed. Details of subroutine step S2408 are already described above with reference to FIG. 15.

<Long Document Reading in which Speed-Fixed Mode is Considered>

FIG. 20 is a flowchart illustrating the long document reading performed by the reading unit in which the speed-fixed mode is considered.

The CPU 14001 of the reading unit and the CPU 3000 sequentially read programs stored in the ROMs 14003 and 3010 into the RAMS 14002 and 3020, and execute the read programs to realize processing illustrated in the flowchart.

In step S2501, document reading with the automatic document conveyance apparatus 200-A starts.

In step S2502, whether the long document reading mode, which is set from the main control unit 400 in step S2403, is set is checked. In a case where the long document reading mode is set (YES in step S2502), the processing proceeds to step S2503, and the set value of the speed-variable long document mode or the speed-fixed long document mode set in step S2406 or S2407 from the main control unit 400 is checked.

In a case where the speed-fixed long document mode is set (YES in step S2503), the processing proceeds to subroutine step S2504, and reading is performed in the non-stop mode. Details of subroutine step S2504 are already described above with reference to FIG. 12.

On the other hand, in a case where the speed-variable long document mode is set (NO in step S2503), the processing proceeds to subroutine step S2505, and reading is performed in the stop mode. Details of subroutine step S2505 are already described above with reference to FIG. 11. When the reading completes, then the processing proceeds to step S2506, and post-processing is performed.

As described above with reference to FIGS. 19 and 20, even in the long document mode, an appropriate reading mode can be selected by considering the job type, and in the case of the speed-fixed different size mixed documents, the non-stop mode can be selected to improve performance.

While the image forming apparatus configured to execute both first processing illustrated in FIGS. 17 and 18 and second processing illustrated in FIGS. 19 and 20 is described as an example in the present exemplary embodiment, the image forming apparatus can be an image forming apparatus configured to execute only one of the first processing and the second processing.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims is to be accorded the broadest interpretation so as to encompass all such modifications and equivalent structures and functions.

This application claims the benefit of Japanese Patent Application No. 2016-146050, filed Jul. 26, 2016, which is hereby incorporated by reference herein in its entirety.

What is claimed is:

1. An image forming apparatus comprising:
   a conveyor capable of conveying a plurality of documents of different sizes;
   a detector configured to detect a size of each of the plurality of documents;
   a reader capable of reading the plurality of documents conveyed by the conveyor;
   a printer configured to print images of the plurality of documents conveyed by the conveyor on a plurality of recording sheets;
   a user interface configured to set a different size mixed documents setting mode for reading a plurality of documents of different sizes by the reader, and to set an automatic magnification function for setting a magnification rate of an image based on a size of a read document and a sheet size on which an image of the document is to be printed; and
   a controller configured to control the conveyor such that, in a case where the different size mixed documents setting mode is set by the user interface and the automatic magnification function is set by the user interface, conveyance of a next document is started after conveyance of a document is completed,
   wherein the controller controls the conveyor such that, in a case where the different size mixed documents setting mode is set by the user interface and the automatic magnification function is not set by the user interface, conveyance of a next document is started before conveyance of a document is completed.

2. The image forming apparatus according to claim 1, further comprising:
   a setting unit configured to set the different size mixed documents setting mode based on an operation of a user.

3. The image forming apparatus according to claim 1, wherein the control unit controls the conveyance unit such that, in a case where the first determination unit determines that the different size mixed documents setting mode is set and the second determination unit determines that the automatic magnification function is set, the plurality of documents is conveyed at a different conveyance speed depending on the size detected by the detecting unit and a setting value of a job for reading the plurality of documents.

4. The image forming apparatus according to claim 1, wherein the setting value is set by a user.

5. The image forming apparatus according to claim 1, wherein, in a case where the different size mixed documents setting mode is set by the user interface and the automatic magnification function is set by the user interface, conveyance speed of the next document and conveyance speed of the document can be made different.

6. The image forming apparatus according to claim 1, wherein, in a case where the different size mixed documents setting mode is set by the user interface and the automatic magnification function is not set by the user interface, conveyance speed of the next document is same as conveyance speed of the document.

7. A method of controlling an image forming apparatus, the method comprising:
- conveying a plurality of documents of different sizes;
- detecting a size of each of the plurality of documents;
- reading the plurality of conveyed documents;
- printing images of the plurality of conveyed documents on a plurality of recording sheets;
- setting a different size mixed documents setting mode for reading a plurality of documents of different sizes;
- setting an automatic magnification function for setting a magnification rate of an image based on a size of a read document and a sheet size on which an image of the document is to be printed;
- performing control such that, in a case where the different size mixed documents setting mode is set and the automatic magnification function is set, conveyance of a next document is started after conveyance of a document is completed; and
- performing control such that, in a case where the difference size mixed documents setting mode is set and the automatic magnification function is not set, conveyance of a next document is started before conveyance of a document is completed.

8. A non-transitory computer-readable medium storing a computer program for causing a computer to execute a method of controlling an image forming apparatus, the method comprising:
- conveying a plurality of documents of different sizes;
- detecting a size of each of the plurality of documents;
- reading the plurality of conveyed documents;
- printing images of the plurality of conveyed documents on a plurality of recording sheets;
- setting a different size mixed documents setting mode for reading a plurality of documents of different sizes;
- setting an automatic magnification function for setting a magnification rate of an image based on a size of a read document and a sheet size on which an image of the document is to be printed;
- performing control such that, in a case where the different size mixed documents setting mode is set and the automatic magnification function is set, conveyance of a next document is started after conveyance of a document is completed; and
- performing control such that, in a case where the different size mixed documents setting mode is set and the automatic magnification function is not set, conveyance of a next document is started before conveyance of a document is completed.

* * * * *